United States Patent
Schmidbauer et al.

(10) Patent No.: US 12,434,247 B2
(45) Date of Patent: Oct. 7, 2025

(54) METHOD AND DEVICE FOR EXTRACTING AND/OR REPRODUCING A TARGET NUCLEIC ACID

(71) Applicant: HP Health Solutions Germany GmbH, Gräfelfing (DE)

(72) Inventors: Simon Schmidbauer, Martinsried (DE); Juliane Duczek, Martinsried (DE); Cordula Urban, Martinsried (DE); Bettina Grotz, Martinsried (DE); Ricarda Mayer, Martinsried (DE); Eimantas Ruseckas, Martinsried (DE); Joachim Stehr, Martinsried (DE); Federico Bürsgens, Martinsried (DE); Lars Ullerich, Martinsried (DE)

(73) Assignee: HP Health Solutions Germany GmbH, Gräfelfing (DE)

( * ) Notice: Subject to any disclaimer, the term of this patent is extended or adjusted under 35 U.S.C. 154(b) by 1004 days.

(21) Appl. No.: 17/609,372

(22) PCT Filed: May 6, 2020

(86) PCT No.: PCT/EP2020/062531
§ 371 (c)(1),
(2) Date: Nov. 18, 2021

(87) PCT Pub. No.: WO2020/225286
PCT Pub. Date: Nov. 12, 2020

(65) Prior Publication Data
US 2022/0274116 A1    Sep. 1, 2022

(30) Foreign Application Priority Data

May 7, 2019 (DE) .......................... 102019111841.7
May 24, 2019 (DE) .......................... 102019114011.0

(51) Int. Cl.
*C12Q 1/686* (2018.01)
*B01L 7/00* (2006.01)

(52) U.S. Cl.
CPC ................ *B01L 7/52* (2013.01); *C12Q 1/686* (2013.01); *B01L 2400/0445* (2013.01)

(58) Field of Classification Search
CPC .................................................... C12Q 1/686
See application file for complete search history.

(56) References Cited

U.S. PATENT DOCUMENTS 6,093,370 A * 7/2000 Yasuda ................ B01L 3/5027
422/68.1
2005/0239119 A1 10/2005 Tsukada

FOREIGN PATENT DOCUMENTS

DE 10 2013 215 168.3 A1    2/2015
DE 10 2016 120 124.3 A1    4/2018
(Continued)

OTHER PUBLICATIONS

Sieben V J et al., FISH and chips: chromosomal analysis on microfluidic platforms, journal, Jun. 18, 2007, pp. 27-35, vol. 1, No. 3, Institution of Engineering and Technology, Alberta, Canada.
(Continued)

*Primary Examiner* — Young J Kim
(74) *Attorney, Agent, or Firm* — Foley & Lardner LLP

(57) ABSTRACT

A method for extracting a target nucleic acid from a sample liquid includes providing a heating device having a heating element in contact with the sample liquid. The heating element is conjugated with at least one functional nucleic acid. The functional nucleic acid is adapted to hybridize to the target nucleic acid and bind the target nucleic acid to the heating element. Further, the method includes generating relative movement between the heating element and the sample liquid and extracting the target nucleic acid from the
(Continued)

sample liquid by separating the heating element from the sample liquid.

24 Claims, 7 Drawing Sheets

Specification includes a Sequence Listing.

(56) References Cited

FOREIGN PATENT DOCUMENTS

| DE | 10 2018 103 215 B3 | 8/2019 |
|----|---|---|
| WO | 95/25592 A1 | 9/1995 |
| WO | 2018/073435 A1 | 4/2018 |
| WO | 2020/225286 A1 | 11/2020 |

OTHER PUBLICATIONS

Johan Vanderhoeven et al., Comparison of a pump-around, a diffusion-driven, and a shear-driven system for the hybridization of mouse lung and testis total RNA on microarrays, journal, Sep. 30, 2005, pp. 3773-3779, vol. 26, No. 19, Wiley-VCH Verlag Gmbh & Co. KGaA, Weinheim, Germany.

Erickson D et al., Electrokinetically controlled DNA hybridization microfluidic chip enabling rapid target analysis, journal, Dec. 15, 2004, pp. 7269-7277, vol. 76, No. 24, Amercian Chemical Society, published on web.

D. Renneberg and C.J. Leumann, Watson-Crick base-pairing properties of tricyclo-DNA, journal American Chemical Society, Jan. 11, 2002, pp. 5993-6002, vol. 124, American Chemical Society, published on web.

\* cited by examiner

SEQUENCE LISTING

```
<160> NUMBER OF SEQ ID NOS: 5

<210> SEQ ID NO 1
<211> LENGTH: 35
<212> TYPE: DNA
<213> ORGANISM: artificial sequence
<220> FEATURE:
<223> OTHER INFORMATION: synthetic
<220> FEATURE:
<221> NAME/KEY: misc_feature
<223> OTHER INFORMATION: sequence with 3' end specific for MRSA
      (Methicillin-resistant Staphylococcus aureus)

<400> SEQUENCE: 1
aaaaaaaaaa aaaaaaaaaa aaaaaaaaaa aaaaa                             35

<210> SEQ ID NO 2
<211> LENGTH: 24
<212> TYPE: DNA
<213> ORGANISM: artificial sequence
<220> FEATURE:
<223> OTHER INFORMATION: synthetic
<220> FEATURE:
<221> NAME/KEY: misc_feature
<223> OTHER INFORMATION: primer specific for MRSA

<400> SEQUENCE: 2
aaatgattat ggctcaggta ctgc                                         24

<210> SEQ ID NO 3
<211> LENGTH: 24
<212> TYPE: DNA
```

```
<213> ORGANISM: artificial sequence
<220> FEATURE:
<223> OTHER INFORMATION: synthetic
<220> FEATURE:
<221> NAME/KEY: misc_feature
<223> OTHER INFORMATION: primer specific for MRSA

<400> SEQUENCE: 3
aaatgattat ggctcaggta ctgc                                          24

<210> SEQ ID NO 4
<211> LENGTH: 23
<212> TYPE: DNA
<213> ORGANISM: artificial sequence
<220> FEATURE:
<223> OTHER INFORMATION: synthetic
<220> FEATURE:
<221> NAME/KEY: misc_feature
<223> OTHER INFORMATION: primer specific for MRSA

<400> SEQUENCE: 4
tgaagatgtg cttacaagtg cta                                           23

<210> SEQ ID NO 5
<211> LENGTH: 24
<212> TYPE: DNA
<213> ORGANISM: artificial sequence
<220> FEATURE:
<223> OTHER INFORMATION: synthetic
<220> FEATURE:
<221> NAME/KEY: misc_feature
<223> OTHER INFORMATION: TaqMan probe

<400> SEQUENCE: 5
tccaccctca aacaggtgaa ttat                                          24
```

METHOD AND DEVICE FOR EXTRACTING AND/OR REPRODUCING A TARGET NUCLEIC ACID

CROSS REFERENCE TO RELATED APPLICATIONS

This application is a continuation application of international application PCT/EP2020/062531, filed May 6, 2020, which claims priority to German patent applications DE 10 2019 111 841.7, May 7, 2019, and DE 10 2019 114 011.0, May 24, 2019, all of which are hereby incorporated by reference in their entireties.

INCORPORATION OF SEQUENCE LISTING

The ASCII text file with the name GNA1062P23US_ST25.txt, created on Mar. 21, 2022, having a size of 1,528 bytes and including a sequence listing, is hereby incorporated by reference in its entirety.

TECHNICAL FIELD

The disclosure relates to methods and an apparatus for extracting and/or amplifying a target nucleic acid. The disclosure is thus in the field of molecular diagnostics and, in particular, in the field of extraction and/or purification and/or amplification of nucleic acids, the latter, for example, by means of a polymerase chain reaction (PCR).

BACKGROUND

In the prior art, methods are known in which a polymerase chain reaction is carried out by means of local heating in order to amplify a nucleic acid in a reaction solution. Such a method is known in particular from DE 10 2016 120 124 A1. In this process, heating elements designed as heating wires are functionalized with oligonucleotides, with which the target nucleic acid to be amplified can be bound to the respective heating elements. For example, the oligonucleotides can be designed as primer oligonucleotides for the polymerase chain reaction, although this is not absolutely necessary.

In order for a target nucleic acid freely present in the reaction solution to bind or hybridize to one of the oligonucleotides functionalized to a heating element, it is necessary that the target nucleic acid be in sufficiently close spatial proximity to the oligonucleotide, in addition to a suitable chemical environment and temperature.

A sufficiently close proximity is also required, for example, to extract a target nucleic acid that is free in a sample liquid, for example, by hybridizing it to an extraction nucleic acid that is functionalized to a heating element or other substrate.

The process of spatial assembly of target nucleic acid and functional nucleic acid or extraction nucleic acid or primer, respectively, on the heating elements conventionally follows essentially a Brownian molecular motion or an undirected diffusion. In prior art methods, Brownian molecular motion or diffusion typically does not allow for rapid assembly of target nucleic acid and functional nucleic acid or primers on the heating elements, which in many preferred embodiments are localized only at discrete locations and are not homogeneously distributed throughout the volume of the sample liquid, unlike, for example, free primers. In conventional methods, this leads to an unnecessarily long waiting until a sufficient amount of target nucleic acids has found the functional nucleic acid or primers on the heating elements, especially if the initial concentration of the nucleic acid to be amplified is very low. In doing so, this may unnecessarily prolong the overall process of detection and characterization of nucleic acids. It can also lead to the situation that, if one does not wait long enough for a sufficient amount of target nucleic acids to find the functional nucleic acid or primer on the heating elements, at the beginning of the amplification reaction no nucleic acid at all (or too few) will be bound to the functional nucleic acid or primer on the heating elements. The target nucleic acid may therefore not (or not reliably) be detected or characterized in the amplification reaction, although it was present in the starting liquid that was brought into contact with the heating elements or the functional nucleic acids or primers on the heating elements.

Thus, the detection or characterization reaction may give incorrect results, give correct results only in a small percentage, or give results unnecessarily late.

The lower the concentration of the target nucleic acid in the sample liquid and/or in the reaction solution, the greater the average distance between the target nucleic acid and a functional nucleic acid or a heating element. Accordingly, at low concentrations of target nucleic acids in the sample liquid and/or the reaction solution, a significant amount of time may be required for the target nucleic acid to hybridize to the oligonucleotides and/or to the functional nucleic acids to a sufficient extent to achieve efficient extraction and/or amplification of the target nucleic acid.

SUMMARY

It is therefore the task of the disclosure to provide a method and a device that increase the extraction and/or amplification efficiency and/or sensitivity and/or reduce a time required for this.

In an example, the disclosure relates to a method for extracting a target nucleic acid from a sample liquid. The method comprises providing a heating device having a heating element in contact with the sample liquid, wherein the heating element is conjugated with at least one functional nucleic acid, and wherein the at least one functional nucleic acid is adapted to hybridize with the target nucleic acid and bind the target nucleic acid to the heating element. The method further comprises generating relative movement between the heating element and the sample liquid and extracting the target nucleic acid from the sample liquid by separating the heating element from the sample liquid.

In another example, the disclosure relates to a method for amplifying a target nucleic acid in a reaction solution comprising providing a heating device having a heating element in contact with the reaction solution, wherein the heating element is conjugated with at least one functional nucleic acid and wherein the at least one functional nucleic acid is adapted to hybridize to the target nucleic acid. The method further comprises generating relative movement between the heating element and the reaction solution, and amplifying the target nucleic acid by a polymerase chain reaction in the reaction solution using the heating device.

In another example, the disclosure relates to a method for amplifying a target nucleic acid comprising extracting the target nucleic acid from a sample liquid by providing a heating device having a heating element in contact with the sample liquid, wherein the heating element is conjugated with at least one functional nucleic acid, and wherein the at least one functional nucleic acid is adapted to hybridize with the target nucleic acid and to bind the target nucleic acid to the heating element. Further, the method comprises amplifying the target nucleic acid extracted from the sample liquid by a polymerase chain reaction in a reaction solution using the heating device. In this regard, extracting the target nucleic acid further comprises generating relative movement between the heating element and the sample liquid. Alternatively or additionally, amplifying the target nucleic acid further comprises generating a relative movement between the heating element and the reaction solution.

In another example, the disclosure relates to an apparatus for extracting and/or amplifying a target nucleic acid. The device comprises a heating device comprising a heating element, wherein the heating element is contactable with a sample liquid and/or with a reaction solution and is conjugated with at least one functional nucleic acid, wherein the at least one functional nucleic acid is adapted to hybridize with the target nucleic acid and to bind the target nucleic acid to the heating element. In addition, the device comprises moving device adapted to generate a relative movement between the at least one heating element and the reaction solution and/or the sample liquid when the heating element is in contact with the reaction solution or the sample liquid, respectively.

The examples offer the advantage that the coming together of target nucleic acid and functional nucleic acid or heating element can be favored and accelerated. The relative movement between the heating element and the sample liquid or reaction solution can effectively increase the volume with which the heating element is in contact, so that the probability of a target nucleic acid reaching a functional nucleic acid at a sufficiently close distance to hybridize with it is also increased. In this way, extraction and/or amplification of the target nucleic acid can be accelerated and/or the sensitivity can be increased by simple and inexpensive means.

The examples further offer the advantage that they may further reduce the time required to perform polymerase chain reactions carried out using local heating and which are described, for example, above and in DE 10 2016 120 124 A1, and/or may increase the efficiency and/or sensitivity. In particular, the examples may provide the advantage that, in a polymerase chain reaction based on local heating, lower initial concentrations of the target nucleic acid may be sufficient when using the method according to the disclosure, since the relative movement increases the probability of finding the target nucleic acids together with a functional nucleic acid. Thus, the examples can further improve the sensitivity for detection of target nucleic acids and their amplification.

Furthermore, the examples offer the advantage that the hybridization of the target nucleic acid to a functional nucleic acid is not limited by the diffusion and/or Brownian motion of the target nucleic acid in the sample liquid and/or reaction solution and, thus, the sensitivity and speed of extraction and/or amplification can be increased.

The sample liquid may be a starting liquid containing the target nucleic acid (e.g. sample material containing the target nucleic acid or sample material in which the target nucleic acid has been (previously) released (e.g. from pathogens and/or cells) or a liquid in which the nucleic acid is already present in the purified state). The sample liquid may also have or be provided with reagents that promote hybridization of the target nucleic acid to the functional nucleic acid or extraction nucleic acid or primer oligonucleotide on the heating element, such as respective salts.

The sample liquid may be a liquid that may contain the target nucleic acid and also comprises other components. In particular, the sample liquid may have other components which are not to be extracted. These other components may comprise other nucleic acids, i.e. nucleic acids that have a different nucleotide sequence. Also, the other components may have impurities that are of a non-nucleotide nature. In particular, the sample liquid may be a fluid that is, for example, of human and/or animal and/or plant and/or other organic origin. For example, the sample liquid may comprise or consist of blood and/or secretion and/or bodily excretions and/or secretions from mucous membranes and/or saliva and/or cellular fluid. The sample liquid may have been subjected to one or more treatments prior to extraction to at least partially release any nucleic acids present in the sample liquid. For example, the sample liquid may have been subjected to a treatment in order to lyse or disrupt cells present therein, for example, in order to at least partially release the nucleic acids possibly present therein from the cells, so that the nucleic acids are preferably present freely in the sample liquid and are at least partially not or no longer enclosed in cell nuclei and/or cells. Lysing may be carried out in such a way that the released nucleic acids are at least not completely destroyed and, particularly preferably, are completely preserved or remain intact.

In particular, the sample liquid may preferably be present in such a way that it is not possible to perform an amplification reaction for amplifying the extracted nucleic acid in the sample liquid. For example, the sample liquid may have physical and/or chemical and/or biological properties that prevent an amplification reaction, such as PCR, from being performed in the sample liquid. For example, the sample liquid may have a viscosity and/or a pH value and/or a salt concentration and/or polarity and/or enzymes and/or proteases which do not allow an amplification reaction to be carried out, for example because the required activity of the polymerase enzymes is inhibited or enzymes such as proteases are present which can degrade the polymerase enzymes.

At least one parameter of the sample liquid may be be adjusted to allow hybridization of the target nucleic acid to the functional nucleic acid given the level of complementarity present. For example, a concentration of $MgCl_2$ in the sample liquid may be increased to allow hybridization even at low levels of complementarity, whereas preferably the concentration of $MgCl_2$ in the sample liquid may be decreased to allow hybridization only at a certain higher level of complementarity.

The heating element is brought into contact with the sample liquid in such a way that the nucleic acid to be extracted from the sample liquid binds at least partially to the functional nucleic acid. This may comprise that at least at the contact surface between the heating element and the sample liquid, i.e. at the surface of the heating element and/or in the immediate vicinity, hybridization conditions prevail at least in part, which favor and/or enable hybridization of the nucleic acid to be extracted with the extraction nucleic acid. For example, the hybridization conditions may comprise a temperature and/or a pH and/or a salt concentration in a certain range. According to an example, the heating element may thereby be heated such that the temperature required to enable hybridization of the nucleic acid to be extracted with the functional nucleic acid is provided in the immediate environment, at least temporarily. According to a further example, the heating element and the sample liquid can preferably also be heated most homogeneously, i.e. heated in such a way that the heating elements have the same or nearly the same temperature as the reaction solution, in order to enable an effective hybridization of the nucleic acid to be extracted to the functional nucleic acid. This may be achieved by the heating element and/or by an optional further heating device, such as a temperature control block, which is preferably located outside the sample liquid. For this purpose, for example, the entire device containing the heating elements as well as the sample liquid can be heated to a base temperature of, for example, between 35° C. and 80° C. and optionally between 40° C. and 70° C. Such a base temperature can preferably be set at least temporarily during the extraction. During an optional amplification after the extraction, it is optionally possible to refrain from setting the same base temperature and/or to set a different base temperature or global temperature of the reaction solution.

The reaction solution may have reagents necessary for amplification by polymerase chain reaction and can be brought into contact with the heating elements or the functional nucleic acids or primers on the heating elements to allow binding the target nucleic acid to the functional nucleic acid on the heating elements.

The reaction solution may be a liquid in which the target nucleic acid can survive as such in single-stranded and/or double-stranded form and or is stabilized. However, the reaction solution is different from the sample liquid. In other words, the reaction solution is optionally such that the target nucleic acid is not damaged by interaction with the reaction solution. For example, the reaction solution may be present as an aqueous solution and/or as a buffer solution. Provided that an amplification of the target nucleic acid is intended after extraction of the target nucleic acid, the reaction solution may be configured such that the reaction solution enables such amplification solution to be carried out. For example, the reaction solution may be designed as a buffer solution in which it is possible to carry out a PCR to at least partially amplify the target nucleic acid. The reaction solution may be provided in a reaction vessel. The reaction solution provided may have a volume of at least 1 µl and not more than 10 ml, more preferably of at least 5 µl and not more than 1 ml, most preferably of at least 10 µl and not more than 100 µl.

In the context of the present disclosure, the terms "nucleic acid" and "oligonucleotide" include not only (deoxy)-ribonucleic acids or (deoxy)-oligo ribonucleotides, even if the aforementioned are preferred, but also nucleic acids and oligonucleotides which contain one or more nucleotide analogs with modifications at their backbone (for example methyl phosphonates, phosphothioates or peptide nucleic acids (PNA), in particular at a sugar of the backbone (for example, 2'-alkyl derivatives, 3'- and/or 5'-aminoriboses, locked nucleic acids [LNA], hexitol nucleic acids, morpholinos, glycol nucleic acid (GNA), threose nucleic acid (TNA), or tricyclo-DNA, compare the paper by D. Renneberg and C. J. Leumann, "Watson-Crick base-pairing properties of tricyclo-DNA," J. Am. Chem. Soc., 2002, vol. 124, pages 5993-6002, the contents of which are incorporated herein by reference) or which contain base analogs, for example, 7-deazapurines or universal bases such as nitroindole or modified natural bases such as N4-ethyl cytosine. In one example, the nucleic acids or oligonucleotides are conjugates or chimeras with non-nucleoside analogs, for example PNA. In one example, the nucleic acids or oligonucleotides contain at one or more positions non-nucleoside and/or non-nucleotide moieties such as spacers, for example hexaethylene glycol or Cn-spacers with n between 3 and 6. Insofar as the nucleic acids or oligonucleotides contain modifications, these are chosen such that hybridization with natural DNA/RNA analytes is also possible with the modification. Optional modifications influence the melting behavior, preferably the melting temperature, in particular to be able to distinguish hybrids with different degrees of complementarity of their bases (mismatch discrimination). Optional modifications include LNA, 8-aza-7-deaza-purines, 5-propynyl uracil and cytosine, and/or abasic breaks or modifications in the nucleic acid or oligonucleotide. Further modifications in the sense of the disclosure include, for example, modifications with biotin and/or thiol and/or sulfur and/or fluorescent donor and fluorescent acceptor molecules.

The terms target nucleic acid and nucleic acid are used as equivalents in the context of this disclosure, unless otherwise stated. In this context, that the nucleic acid is extracted from the sample liquid means that the nucleic acid is at least partially isolated from the sample liquid and can optionally be separated from the sample liquid. The nucleic acid to be extracted from the sample liquid may also be referred to as the target nucleic acid or target nucleic acid. In particular, extracting a nucleic acid may thus comprise or serve to separate the nucleic acid from the sample liquid. In this context, the extraction of the nucleic acid can be designed in such a way that only the nucleic acid to be extracted is extracted from the sample liquid or other components of the sample liquid are also extracted, such as other nucleic acids. However, optionally only the nucleic acid to be extracted may be extracted from the sample liquid, so that in particular other nucleic acids and other components of the sample liquid are not extracted with it, but remain in the sample liquid. After extraction of the nucleic acid, the concentration and/or the number of copies of the extracted nucleic acid in the sample liquid may be lower than before extraction, provided that the nucleic acid to be extracted was present in the sample liquid at all before extraction.

The functional nucleic acid may be at least partially complementary to the target nucleic acid. The fact that the functional nucleic acid is at least partially complementary to the target nucleic acid means in this context that the functional nucleic acid and the target nucleic acid can hybridize or bind to each other via at least one base pair. In other words, the functional nucleic acid has at least one base in its sequence that is complementary to at least one base of the target nucleic acid or the nucleic acid to be extracted. However, the functional nucleic acid may have a greater complementarity to the target nucleic acid, i.e., optionally the base sequence of the functional nucleic acid is complementary to one or more sections of the base sequence of the target nucleic acid not only in one base, but in several, optionally successive, bases, optionally at least 5, optionally at least 10, optionally at least 15, optionally at least 20 base pairs, which are particularly preferably arranged sequentially without other bases being interposed, are complementary to a corresponding sequence of the target nucleic acid. Optionally, at least 1%, optionally at least 5%, optionally at least 10%, optionally at least 20%, optionally at least 30%, optionally at least 40%, optionally at least 50%, optionally at least 60%, optionally at least 70%, optionally at least 80% and optionally at least 90% of the base sequence of the functional nucleic acid are complementary to a corresponding sequence of the target nucleic acid. According to an example, the extraction nucleic acid may be substantially fully complementary to a corresponding sequence of the target nucleic acid, i.e., apart from a few missing sites, the base sequence of the functional nucleic acid may be fully complementary to a corresponding sequence segment of the target nucleic acid. Insofar as the functional nucleic acid has several different sections of base sequences, for example a functional section which is to serve for hybridization to the target nucleic acid and also a connecting section, such as a spacer or spacer sequence for spacing the functional section from the heating element, the explanations given above concerning complementarity between the functional nucleic acid and the target nucleic acid preferably refer only to the functional section of the functional nucleic acid.

A higher degree of complementarity between the functional nucleic acid and the target nucleic acid may offer advantages in terms of selectivity during extraction. For example, a high degree of complementarity between the functional nucleic acid and the target nucleic acid may allow essentially only the target nucleic acid to bind to the functional nucleic acid, while binding of other nucleic acids from the sample liquid to the functional nucleic acid is an exception. On the other hand, a low degree of complementarity between the functional nucleic acid and the target nucleic acid may preferably allow binding of different nucleic acids from the sample liquid to the functional nucleic acid, so that other nucleic acids can be extracted from the sample liquid and/or the target nucleic acid can be extracted even if, if the functional nucleic acid has only a low degree of complementarity to it, for example because the base sequence of the target nucleic acid is not known to a sufficient degree and accordingly the functional nucleic acid cannot be matched exactly to the target nucleic acid.

The fact that the heating element is functionalized with a functional nucleic acid means that the functional nucleic acid is bound to the heating element. This in turn means that the functional nucleic acid is mechanically firmly bonded to the heating element, in particular by a chemical and/or electrostatic bond. For example, the functional nucleic acid may be bound to a surface of the heating element by means of one or more thiol bonds and/or sulfur bonds. For this purpose, the heating element may be at least partially provided on its surface with a material that allows the binding of nucleic acids. For example, a gold-plated surface can be used to bind the extraction nucleic acid and optionally other nucleic acids to the heating element via one or more thiol and/or sulfur bond(s). Also, for example, a streptavidin-biotin bond can be used to bind the functional nucleic acid and/or other nucleic acids to the heating element if, for example, optionally previously, one of the two partners (streptavidin or biotin) has been bound to the heating elements and the functional nucleic acid is modified (preferably at the 5' end) with the other of the two partners and subsequently bound to the heating element thereover. Other modifications, such as amino or carboxy groups, can also be used to bind the functional nucleic acid to the heating element, and the surface of the heating element can be modified for this purpose, for example, preferably beforehand, with epoxy and/or a metal. Binding may take place such that the 5' end of the functional nucleic acid is bound to the heating element, leaving the 3' end free. This can be particularly advantageous if the extraction nucleic acid is to serve as a primer in an amplification reaction to be carried out after extraction.

That the heating element is in contact with the sample liquid or with the reaction solution may involve that the target nucleic acid can bind at least partially to the functional nucleic acid. This may require that at least at the contact surface between the heating element and the sample liquid or reaction solution, i.e., at the surface of the heating element and/or in the immediate vicinity, hybridization conditions prevail at least in part that favor and/or enable hybridization of the target nucleic acid with the functional nucleic acid. For example, the hybridization conditions may comprise a temperature and/or a pH and/or a salt concentration in a certain range. According to an example, the heating element may thereby be heated such as to provide, at least temporarily, the required temperature in the immediate environment to enable hybridization of the target nucleic acid with the functional nucleic acid. According to a further example, the heating element and the sample liquid can preferably also be heated most homogeneously, i.e. in such a way that the heating elements have the same or nearly the same temperature as the reaction solution, in order to enable effective hybridization of the nucleic acid to be extracted to the functional nucleic acid. This can optionally be realized by the heating element and/or by an optional further heating device, preferably located outside the sample liquid. For this purpose, for example, the entire device containing the heating elements as well as the sample liquid can be heated to a base temperature of, for example, between 35° C. and 80° C. and particularly preferably between 40° C. and 70° C. Such a base temperature can preferably be set at least temporarily during the extraction. During an optional amplification after the extraction, it is optionally possible to refrain from setting the same base temperature and/or to set a different base temperature or global temperature of the reaction solution.

A polymerase chain reaction or PCR in the sense of the present disclosure is a method for amplifying target nucleic acids in which an amplification cycle consisting of the steps denaturation, hybridization and elongation is repeatedly run, preferably in this order. In each run, the number of nucleic acid molecules and, in particular, target nucleic acids may be increased (typically doubled in the best case) such that there may be an exponential increase in the number of nucleic acid molecules. In the following, a target nucleic acid to be amplified is referred to as an "original". The original is a single strand and can form a double strand together with its complementary strand, which is referred to as the "complement". The original and also the complement may be part of a larger nucleic acid. In particular, in a PCR, a copy of the original formed in one run of the amplification cycle may be a template for forming a complement in a subsequent run, and a copy of the complement formed may be a template for forming an original in a subsequent run. A common name for the amplification product is "amplicon."

The denaturation step is used to denature a nucleic acid double strand, that is, to separate it into its two single strands. For example, the denaturation step may separate the original from the complement. The preferred type of denaturation according to the disclosure is a thermal denaturation (also referred to as "melting"). For this purpose, at least part of the nucleic acid double strand or the entire double strand is subjected to a temperature, referred to as "denaturation temperature", which causes or at least promotes separation of the nucleic acid double strands. On the one hand, the preferred denaturation temperature is chosen high enough to allow separation of nucleic acid double strands. On the other hand, the preferred denaturation temperature is chosen low enough that a DNA polymerase, which may also be present in the sample, is not significantly damaged. A typical value for the denaturation temperature is 95° C.

To facilitate the following explanation of the disclosure, "denaturation step" in the nomenclature of the present disclosure means the step of the process in which the heating device generates heat to heat the reaction volume and thereby cause denaturation of double-stranded nucleic acid molecules. Accordingly, the duration of the denaturation step is the sum of the time during which the heating device generates heat in the run of the cycle of the PCR relating to the denaturation step. Thus, in the case of a heating resistor as a heating device and/or as a heating element, the duration of the denaturation step is the duration of an electrical current passing through the heating device or through the heating element, respectively, to heat the reaction volume and thereby cause denaturation of double-stranded nucleic acid molecules. If, in one run of the duplication cycle, the heating device or heating element generates the heat in several separate time intervals instead of one (which may be advantageous, as discussed further below), the duration of the denaturation step is the sum of the durations of these intervals. In particular, the denaturation step thus defined does not include a release of heat due to the inherent heat capacity of the heating element, nor does it include the decay of the temperature in the part of the reaction volume adjacent to the heating element, even if the temperatures present there are still within the range required for denaturation. In particular, this means that in the process according to the disclosure denaturation can still take place after the denaturation step thus defined. It also means that the released heat in the denaturation step is generally less than the heat generated in the denaturation step.

The heating of the heating element(s), which may be designed as resistive heating elements and optionally as heating wires, can be achieved by means of short electrical pulses with which the heating element(s) are provided with electrical current. This may be done in such a way that only the immediate vicinity of the heating element(s) of the heating device is heated locally for a short time, optionally in order to carry out the denaturation of the nucleic acid molecules in the reaction volume, while the bulk of the reaction volume, i.e. the reaction solution, remains at a (in this sense "global") base temperature at which, in particular, elongation, preferably also hybridization, can take place. This is preferably achieved by the fact that the duration of heating by the heating device is so short that the heat field generated in the surrounding reaction volume can propagate only a few micrometers and in this way creates a heating zone which may comprise only a tiny fraction of the reaction volume. In particular, this allows the amount of heat introduced to be so small that no substantial global heating of the reaction volume takes place.

The "global temperature" in the sense of the present disclosure is the average temperature, in terms of volume, of the reaction volume or the reaction solution in which the PCR takes place, i.e., the temperature that occurs or would occur in the reaction volume after it has been thermalized. The "global warming" is the increase in the global temperature defined in this way.

Further, it is achievable with the disclosure that after heating, especially in the denaturation step, the introduced heat propagating from the heating zone into the rest of the reaction volume causes only a negligible global temperature increase there. "Negligible" means here in particular that the temperature increase is preferably too small for denaturation of the nucleic acid molecules and especially preferably that the temperature increase is too small to interfere with hybridization and elongation.

In the following, local heating in the sense of the disclosure will be explained in more detail. Due to a current flow through a heating element, which can be designed, for example, as a micro heating element, such as a heating wire with a diameter of only about 20 micrometers or less, the heating element starts to heat up at the beginning of the heating pulse. The heating element may be formed of a metallic material and has a very high thermal conductivity. Optionally the heating element is designed in such a way that it heats approximately homogeneously over the duration of the heating pulse. At the surface of the heating element, which is in contact with the reaction solution during PCR, the heat is transferred from the heating element to the reaction solution, where it spreads to an increasingly larger volume. The propagation of a heat field occurs in the reaction solution by heat diffusion, for which the following squareroot dependent path-time law applies:

$$d \approx \sqrt{D \cdot t}$$

Here, d stands for the path distance travelled by a heat front after a time t along a spatial direction in a reaction solution with thermal diffusivity D. This path distance d is referred to in the following as the heat diffusion distance. That is, for an optional typical heating duration of, say, 100 µs, the heat generated in the heating element can travel in the reaction solution with a typical thermal diffusivity (also known as thermal diffusivity) of $D \approx 1.6 \cdot 10^{-7}$ m²/s in terms of size $d \approx \sqrt{1.6 \cdot 10^{-7} m^2/s \cdot 10^{-4} s} \approx 4$ µm diffuse widely. In other words, during this 100 µs period, the heat generated in the heating element by resistive heating has diffused into the reaction solution surrounding the heating element in about 4 µm.

Due to the spatial spreading of the heat according to the above equation, the amount of heat introduced by the heating element into the reaction solution is distributed over an increasingly larger volume of the reaction solution, so that perpendicular to the surface of the heating element, which is a temperature $\Delta T_{Local}$ (or also $\Delta T$ denoted) hotter than the global average temperature, a mean temperature gradient of $\Delta T/d$ (($\Delta T/\sqrt{D \cdot t}$ where t is the duration) establishes, which allows heat transport.

As a result, for example, temperature gradients can be achieved that are optionally greater than 1K/µm, optionally greater than 3K/µm, and optionally greater than 5K/µm, in order to achieve a high localization of the temperature increase. Alternatively or additionally, the thermal gradients are optionally smaller than 1000K/µm and optionally smaller than 300K/µm. This can be advantageous to avoid thermophoretic effects in the reaction solution.

A more accurate estimation of the spatial heat propagation during and after the heating pulse for a given geometry of the heating element can be achieved, for example, by finite element methods, such as with commercial solutions like COMSOL, which allow numerical solution of the heat diffusion equation.

The part of the reaction volume or reaction solution into which the heat can diffuse during the heating pulse is referred to below as the "heating zone" (AHZ). The extent of the heating zone perpendicular to the surface of the heating element can be estimated approximately by the heat diffusion distance defined above.

The volume of the reaction solution that is not in the heating zone will be referred to as the "unheated passive volume" in the following. That is, for example, for a cylindrical heating element (e.g., a heating wire), the AHZ can be estimated as the volume located at a distance of a heat diffusion distance d from the cylinder surface (i.e., the cylinder shell of thickness d). For example, if the heating element is an elongated cylinder of radius r and length l (such as a wire), the volume of the heating zone can preferably be roughly estimated as:

$$V_{AHZ} \approx \pi \cdot l \cdot ((r+d)^2 - r^2).$$

Optionally, only one or more partial volumes of the reaction solution are significantly heated by the appropriate choice of heating duration, which preferably have expansions (measured perpendicularly from the surface of the microheater), i.e. heat diffusion distance of optionally 0.05 µm to 200 µm, optionally 0.1 µm to 100 µm, optionally 0.1

µm to 50 µm, optionally 0.1 µm to 25 µm, optionally 0.1 µm to 15 µm and optionally 0.1 µm to 10 µm. According to the disclosure, "to be significantly heated" means that the temperature increase at the distance of a heat diffusion distance perpendicular from the surface of the heating element is optionally less than 50 K, optionally less than 30 K, optionally less than 20 K, optionally less than 10 K, optionally less than 5 K. On the one hand, sufficient spatial extension of the heated region of the reaction solution perpendicular to the surface of the heating element is intended to ensure that the amplicons formed on the heating element, which typically have a length of 0.02-3 µm (corresponding to about 60-10000 base pairs), can be heated as homogeneously as possible and thus denatured. On the other hand, the heat diffusion distance should preferably be sufficiently small to keep the volume ratio of the heating zone to the unheated passive volume low.

According to an example, the PCR is performed such that in at least one of the runs of the amplification cycle of the PCR, the heater(s) supply less heat generated in the denaturation step to the reaction volume or to the reaction volume or the reaction solution less heat generated in the denaturation step than $CR*5°$ C., and wherein CR is the heat capacity of the reaction volume during heating by the heating device, and no temporally stable temperature gradient is established during the entire denaturation step on at least 10%, but preferably on the entire contact surface of the heating device or the heating element or elements with the reaction volume.

A temperature gradient is considered "stable over time" for the purposes of the present disclosure after a duration $t1$ following the start of heating by the heating element if the magnitude of its maximum slope at a time $2t1$ has changed by less than 30% compared to the magnitude of its maximum slope at time $t1$.

Here, only the comparison of the amounts of the maximum slope is relevant for the determination of the temporal stability, but not whether the heating device or heating element(s) generate heat at time $2t1$ or not. Optionally the amount of the gradient at time $2t1$ has changed by less than 20%, optionally by less than 15%, optionally by less than 10%, optionally by less than 5% compared to the amount of its maximum gradient at time $t1$. The gradient usually has its maximum slope at the surface of the heating element(s).

The denaturation and optionally also other steps of the nucleic acid amplification or PCR can thus take place locally in the direct vicinity of the heating elements, wherein optionally at least one of the required primers is attached (hereinafter referred to as "functionalized") to the heating device or to the heating element or to one of the heating elements, in order to also allow the amplicon to form there and thus enable denaturation upon local heating. In other words, by virtue of the functionalization of the heating device preferably achieving localization of steps of the PCR, in particular hybridization, elongation and/or denaturation, and optionally also generating a signal for monitoring the progress of the PCR in the immediate vicinity of the heating device, heating of the reaction volume can be limited to a fraction of the reaction volume.

The combination of a method according to the disclosure for extracting a target nucleic acid and/or for amplifying a target nucleic acid can thus be combined in a particularly advantageous manner with a device for carrying out a PCR based on local heating. A particular advantage can result from the fact that the target nucleic acid is already bound to the heating element(s) via the functional nucleic acid(s) and the target nucleic acid is therefore already in the heating zone, which can be heated to the denaturation temperature or beyond by local heating. Optionally, at least some of the functional nucleic acids are also designed as primers for the PCR, whereby it can be achieved that the target nucleic acids bound to the heating element by the functional nucleic acids are already hybridized with a primer.

The PCR further optionally utilizes at least two oligonucleotides referred to as "primers," a forward primer (also referred to as a "forward primer") and a reverse primer (also referred to as a "reverse primer"). The forward primer is complementary to the 3' end of the original and the reverse primer is complementary to the 3' end of the complement. In the hybridization step (also referred to as the "annealing step"), the forward primer and/or the reverse primer hybridizes to a sequence complementary to it in the original or complement or amplicon, respectively. The hybridization step usually takes place at a temperature that induces or at least favors hybridization of the forward and reverse primers to their complementary sequences in the original or complement or amplicon, respectively. It is optionally chosen to allow the most specific hybridization of the primers. The hybridization temperature is typically between 50° C. and 72° C. One or more of the primers can preferably be formed by the functional nucleic acid bound to the heating element.

In the elongation step, the hybridized primers are complementarily extended by a polymerase enzyme. Thus, starting from the forward primer a complement and starting from the reverse primer an original can be synthesized. For the purpose of elongation, the polymerase is exposed to a temperature that allows or at least favors elongation. When using a polymerase from the bacterium Thermus aquaticus (Taq), an elongation temperature of 72° C. is typically used. In some embodiments of PCR, the hybridization and elongation temperatures are identical, that is, both steps occur at the same temperature (that is, there are only two temperature steps during PCR, a combined hybridization and elongation temperature and a denaturation temperature).

The denaturation temperature corresponds to a temperature at which a nucleic acid double strand is denatured, i.e., at which the nucleic acid double strand is separated into its two single strands. For example, the extraction nucleic acid can be separated from the nucleic acid hybridized thereto in the denaturation step. The preferred type of denaturation according to the disclosure is thermal denaturation (also referred to as "melting"). For this purpose, at least part of the nucleic acid double strand or the entire double strand is subjected to a temperature which is equal to or higher than the denaturation temperature, which causes or at least promotes separation of the nucleic acid double strands. On the one hand, the preferred denaturation temperature is selected to be high enough to allow separation of nucleic acid double strands. On the other hand, the preferred denaturation temperature is chosen low enough so that a DNA polymerase that may also be present in the reaction solution is not significantly damaged. For example, a typical value for the denaturation temperature may be 95° C. Heating the heating element to a temperature equal to or greater than the denaturation temperature may provide the advantage that the extracted nucleic acid at least partially detaches from the functional nucleic acid and freely passes into the reaction solution. This can be advantageous, for example, for a subsequent amplification of the extracted nucleic acid and/or if the extracted nucleic acid is to be removed or separated from the heating element.

The generation of the relative movement between the heating element and the sample liquid can occur when the heating element is in contact with the sample liquid. Alternatively or additionally, the generation of the relative movement between the heating element and the reaction solution can occur at least partially during a denaturation step of the polymerase chain reaction. This offers the advantage that in this way the hybridization can be particularly favored by the relative movement.

At least during the generation of the relative movement between the heating element and the sample liquid and/or during the generation of the relative movement between the heating element and the reaction solution, a temperature suitable for hybridization of the target nucleic acid to the functional nucleic acid can at least temporarily be provided at least at the site of the functional nucleic acid. This provides effective hybridization of the target nucleic acid to the functional nucleic acid. The temperature may be at least 20° C., optionally at least 30° C., optionally at least 40° C., optionally at least 50° C. and optionally at least 60° C. Alternatively or additionally, the temperature may be not more than 90° C., optionally not more than 80° C., optionally not more than 70° C. This enables a particularly efficient and/or particularly specific hybridization of the target nucleic acid with the functional nucleic acid on the heating elements. In an example, the temperature may be selected such that the most specific and/or most efficient possible binding between the target nucleic acid and a primer sequence of the functional nucleic acid on the heating elements is achieved.

Heat for providing the temperature may be provided at least in part by the heating element. For example, the heating device and/or the heating element can be designed according to the disclosure in DE 10 2016 120 124 A1. In this way, the amplification of the target nucleic acid can be carried out particularly quickly.

The functional nucleic acid may be formed as and/or comprise an oligonucleotide. The functional nucleic acid may be formed as an extraction nucleic acid and/or has a capture nucleotide sequence which is at least partially complementary to the nucleotide sequence of the target nucleic acid and is suitable for binding to the target nucleic acid. This favors hybridization of the target nucleic acid to the functional nucleic acid.

The functional nucleic acid may have a nucleotide sequence that can be used as a primer sequence for the amplification of the target nucleic acid. This offers the advantage that the polymerase chain reaction can be carried out in close proximity to the heating element, which can be particularly advantageous for local heating by means of the heating element.

The sample liquid and/or the reaction solution may contain one or more reagents that promote hybridization of the target nucleic acid with the functional nucleic acid. This may improve the extraction and/or amplification.

The relative movement between the heating element and the sample liquid and/or the reaction solution may at least partially be accomplished by moving the heating element. For example, moving the heating element may comprise oscillating and/or vibrating the heating element. Preferably, the oscillation and/or vibration of the heating element can be caused by means of a magnetic field, wherein the magnetic field may be generated by an electric current flow in the heating element and/or by an external magnetic field. For example, this can be caused by electric current pulses and/or time-varying current flow through the heating elements, e.g. by the magnetic field of the current-carrying conductors of the heating elements interacting with each other. In particular, the Lorentz force may be used to cause the current-carrying heating elements to oscillate and/or vibrate. In this way, a mutual attraction and/or repulsion of parts of the heating element(s) can be brought about, which can lead to an elastic deformation of parts of the heating element(s), so that the heating elements can start vibrating as a result. The oscillation and/or vibration can optionally be induced resonantly or non-resonantly. It can optionally be amplified by the heating elements being in an external magnetic field. The oscillation and/or vibration can optionally be amplified by the fact that there are different distances between adjacent heating elements.

According to an example, the heating elements are excited to oscillate and/or vibrate by carrying an electric current and arranged being in such a way that they attract and/or repel each other when current-carrying and are thus set in motion. For example, a plurality of heating elements in the form of wires can be arranged extending parallel in a plane and extending through the reaction vessel. The spacing of the heating elements may be selected such that the mutual attractive and/or repulsive force of the heating elements is sufficiently high to set the heating elements in oscillation and/or vibration. The heating elements may be arranged relative to each other in such a way that the forces on the heating elements do not cancel each other out when current-carrying. For this purpose, for example, the plurality of heating elements can each be arranged in pairs. This can be achieved, for example, by varying the distances between the heating elements. For example, two heating elements at a time may be spaced a short distance apart in parallel, while the respective pairs of heating elements may be spaced a larger distance apart to prevent complete cancellation of the force effect on the individual heating elements. In other words, for example, the distances between the individual heating elements may be alternately larger and smaller. This can lead to an asymmetrical and/or anisotropic force effect on the individual heating elements, which can cause the heating elements to oscillate and/or vibrate.

According to other examples, one or more external magnets may be provided to provide and/or increase and/or change the force effect on the energized heating elements.

Alternatively or additionally, the oscillation and/or vibration of the heating element may be caused at least in part by the application of a force by a mechanical actuator or actuator and/or by sound waves and/or ultrasonic waves. For example, one end of the heating element may be mechanically energized to cause the oscillation and/or vibration. For example, a mechanical actuator may include one or more piezo actuators and/or one or more vibration motors to cause the one or more heating elements to, oscillate and/or vibrate.

According to an example one or more piezo actuators and/or one or more vibration motors may be used to excite the reaction vessel to oscillate and/or vibrate and in this way to achieve a relative movement of the liquid, i.e. the sample liquid and/or the reaction solution, in the respective reaction vessel relative to the at least one heating element. For example, a piezo actuator supplied with alternating current and/or a vibration motor (such as from a cell phone) and/or a loudspeaker can be used for this purpose, which, by suitable mechanical contacting of the reaction vessel and/or a sample plate with one or more reaction vessels, excite the latter to oscillate and/or vibrate. This can optionally be done in such a way that either the heating device resonates and/or the sample liquid or the reaction solution and heating device follow the excitation in a different way (e.g. with a different amplitude and/or phase), so that a relative movement occurs.

According to some examples, one or more dedicated actuators, such as one or more dedicated piezo actuators, are provided for each reaction vessel. According to other examples, one piezo actuator may be provided for multiple reaction vessels. According to yet other examples a plurality of actuators may be provided which in cooperation cause a plurality of reaction vessels and/or the heating elements and/or liquid therein to vibrate and/or oscillate. According to an example a plurality of reaction vessels may be formed in a sample plate, wherein one or more actuators, such as one or more piezo actuators and/or vibration motors, are provided to excite all of the reaction vessels of the sample plate to vibrate and/or oscillate. The one or more actuators may be arranged, for example, laterally and/or below and/or on at the sample plate. One actuator may be provided per reaction chamber or per sample plate.

Alternatively or additionally, the relative movement may be caused by movement of the heating elements relative to the reaction vessel, e.g. by pulling the heating element(s) through the reaction vessel containing the sample liquid or the reaction solution and/or by moving magnetic fields acting on the magnetic heating elements or by sound waves causing the heating elements to vibrate (for example in the audible range or also in the ultrasonic range).

The relative movement between the heating element and the sample liquid and/or the reaction solution may be at least partially affected by moving the sample liquid or the reaction solution.

The agitation of the sample liquid and/or the reaction solution may be performed at least in part by pumping the sample liquid or the reaction solution in a reaction vessel. This can be done, for example, by pumping the liquid, i.e., the sample liquid or the reaction solution, through the reaction vessel. For this purpose, the reaction vessel can optionally include a further chamber that can accommodate the portion of the reaction volume that has already been brought into contact with the heating elements. The reaction volume may be brought into contact with the heating elements either once or repeatedly (e.g., by pumping back and forth). The total reaction volume may be larger than the volume that can be brought into contact with the heating elements at the same time. The pumping can be done, for example, by changing the geometry of a part of the reaction vessel, i.e., a flexible membrane or surface that is moved from the outside and thus causes a movement of the reaction solution or sample liquid in the reaction chamber.

The agitation of the sample liquid and/or the reaction solution may be at least partly performed by applying sound waves and/or ultrasonic waves to the sample liquid and/or the reaction solution. The impingement with ultrasound and/or sound can, for example, may occur from outside the reaction chamber or the reaction vessel and may be coupled into the reaction liquid and cause there, for example, directed or turbulent flows.

The sample liquid and/or the reaction solution may be moved at least partially by at least one mechanical actuator. The actuator may be externally driven. For example, the actuator can have magnetic elements, such as beads or stirring fish, which are moved by an externally applied magnetic field in the reaction liquid and thus move the reaction liquid.

The agitation of the sample liquid and/or the reaction solution may be at least partly caused by convection, e.g. by deliberately introducing temperature gradients.

The relative movement between the heating element and the sample liquid and/or the reaction solution may be at least partially accomplished by moving a reaction vessel in which the sample liquid and/or the reaction solution is disposed. This may include, for example, shaking, centrifuging, rotating, vortexing, tilting, and/or other forms of motion that may cause the heating elements to move differently than the liquid, optionally due to inertia or friction or their material properties or due to other effects, resulting in relative motion.

Of course, the generation of relative movement may be based on a combination of some or all of the above-described methods for generating relative motion.

The heating device may have several heating elements. In particular, this may allow a larger contact area to be achieved between the sample liquid or reaction solution and the heating element.

The one or more heating elements may be designed as electrical and in particular as resistive heating elements and are optionally designed as heating wire or heating wires. The heating elements may be designed as described in DE 10 2016 120 124 A1. The heating element(s) may each be conjugated with a plurality of functional nucleic acids, wherein the functional nucleic acids of the heating element may be formed in the same way or at least partially in different ways. Each of the heating element(s) may be conjugated with a plurality of functional nucleic acids of the same type, and the different heating element(s) may be conjugated with functional nucleic acids that are at least partially different from the functional nucleic acids of the other heating element(s).

Heating Device

The heating device may consist of one or more heating elements. Alternatively, the heating device may additionally comprise other elements, such as electrical supply and/or discharge lines for electrical current and/or a control device. In any case, in the context of the present disclosure, the heat provided by the heating device is intended to refer to the heat provided by means of the heating element(s) in contact with the reaction solution and/or in contact with the sample liquid, but not any heat generated elsewhere, for example in or on the control device.

In an example the reaction volume or the reaction solution is heated by a heating device with one or more heating elements, wherein the heating element or at least one of the heating elements, especially preferably all heating elements, are electrically contacted. In this way, it is advantageously achievable that the heating element can have current flowing through it or voltage applied to it. This example can take advantage of the fact that electrically contacted heating elements can be operated and regulated particularly easily by an electrical control device. At least one of the heating elements may be a device that converts an electrical current flow into heat, for example through its ohmic resistance. This example may take advantage of the fact that such heating elements can efficiently convert electrical energy into heat. An optional heating element is a heating resistor or a Peltier element. If there are multiple heating elements, they may be connected in series and/or parallel, or partially in series and partially in parallel.

Optional heating elements may include a material disposed between the heat generating component of the heating element and the reaction volume, such as a sheath or a separation layer. Such a material may be useful to protect and/or electrically insulate the heating element from, for example, corrosion or other chemical interactions with the PCR chemistry (hence also referred to herein as a separation layer) and may, for example, be made of polymers. Such heating elements and the reaction volume or the reaction solution can be separated maximally by a separation layer having a thickness of less than 500 μm, optionally a thickness of less than 100 μm, optionally a thickness of less than 20 μm, optionally a thickness of less than 5 μm, optionally a thickness of less than 1 µm, optionally a thickness of less than 0.2 µm, optionally a thickness of less than 0.05 µm. In a further example no separation layer is present between the heating elements and the reaction solution or the reaction volume, or in which the thermal properties of the separation layer are selected such that its effect is negligible with respect to the heat dissipation of the heating device to the reaction volume.

It may be advantageous to achieve a homogeneous temperature as far as possible everywhere on the heating element. In the case of heating resistors, this can be achieved, for example, by enabling a uniform current density during heating and a constant surface-to-volume ratio (OVV) in each section or partial volume of the heating resistor. Advantageously, this can be achieved by ensuring a constant conductor cross-section and voltage drop per unit length of conductor throughout the heating element. In an example, when there are multiple heating elements, they heat the reaction volume in the same manner. However, in another example heating elements heat the reaction volume differently, for example, to different lengths or to different degrees. The heating elements of the heating device may be the same or different, for example with respect to their length or geometry.

The reaction volume is heated by a heating device comprising one or more heating elements, wherein particularly preferably the heating element or at least one of the heating elements, and optionally all heating elements, are in contact with the reaction volume. In an example at least one of the heating elements is adjacent to the reaction volume or to the reaction solution over its entire surface; optionally all of the heating elements are adjacent to the reaction volume or to the reaction solution over their entire surface. It can be an achievable advantage of this example that the reaction volume or the reaction solution can be efficiently heated by the respective heating element in the vicinity of the heating element. Also, it is an achievable advantage of this example that in order to achieve high reaction kinetics (specifically, hybridization kinetics of nucleic acid molecules to primers, which are preferably disposed on the heating element, as discussed below), the heating device has as large an accessible surface area as possible.

Optionally the heating elements have an OVV that is as high as possible in order to enable the most effective delivery of heat to the (immediate) environment, and at the same time have a volume that is as low as possible in order to ensure a low heat capacity of the heating element. Some examples have an OVV for the heating elements that is more than $10^3$ m$^{-1}$ (per meter), preferably more than $10^4$ m$^{-1}$ and particularly preferably more than $5*10^4$ m$^{-1}$. However, too large an OVV may in some cases lead to very filigree and thus mechanically unstable structures, so that it can be advantageous to keep the OVV smaller than $10^9$ m$^{-1}$, optionally smaller than $10^8$ m$^{-1}$ and in some cases even smaller than $10^7$ m$^{-1}$.

For example, for a long wire (length much longer than diameter), the OVV is calculated as $2/r$, where r is the radius of the wire. For a thin film or foil (thickness much smaller than length and lateral extension), the OVV is calculated as $1/d$, where d is the thickness of the film or foil. According to the disclosure, it only the surface that is in contact with the reaction volume may be considered; also, only the volume whose surface(s) is in contact with the reaction volume may be considered (that is, for example, feed lines that do not run through the solution are not to be considered as relevant volumes and surfaces according to the disclousre). The same applies accordingly to the subsequent consideration of volume filling factor and heat capacity.

In an example the ratio between the surface area of the heater in contact with the reaction volume and the reaction volume can be larger than 0.1 m$^{-1}$, optionally larger than 1 m$^{-1}$, optionally larger than 5 m$^{-1}$, optionally larger than 10 m, optionally larger than 20 m$^{-1}$, optionally larger than 50 m$^{-1}$, and optionally larger than 100 m$^{-1}$. With this example, favorable reaction kinetics can advantageously be achieved in that, in a large part of the reaction volume, components of the reaction volume can quickly reach the surface of a heating element by diffusion in order to participate in the steps of the nucleic acid multiplication process taking place there. Also, in the case described further below of heating elements that are at least partially functionalized on their surface with one of the reactants (for example, a primer), it can be exploited that a larger surface area also makes more reactants available.

To prevent the structure of the heating element from becoming too filigree, or the movement of the nucleic acid molecules and other reactants present in the reaction volume from being hindered by too many surfaces, the ratio of the surface area of the heating element or elements relative to the size of the reaction volume may be less than $10^6$ m$^{-1}$, optionally less than $10^5$ m$^{-1}$, optionally less than 10 m$^{-1}$, $^{-1}$ and optionally less than $10^3$ m$^{-1}$.

In order to keep the heat supplied to the reaction volume by the heating device in the denaturing step as low as possible, it can be advantageous to also keep the heat capacity of the heating device or heating element(s) low, since the higher the heat capacity of the heating device or heating element(s), the larger the amount of energy required to achieve a certain temperature increase on the surface of the heating elements. The amount of energy supplied to the reaction volume by the heating device in the denaturation step subsequently spreads to the entire reaction volume. The heat capacity of the heating element in this case results from the product of the respective volume and the specific volumetric heat capacity of the respective material of which the respective volume consists. A significant degree of freedom in the design of the heating device is its dimensioning. Therefore, it can be advantageous to keep the volume of the heating device, in particular the material thickness, as small as possible. It is noteworthy here that the heat diffusion distance does not depend on the size of the heating device, but only on the heating duration. In an example, the volume of all heating elements of the heating device is less than 10%, optionally less than 5%, optionally less than 3% and optionally less than 1% of the reaction volume. With this example, advantageously, a low heat capacity of the heating device or the heating element or the heating elements can be achieved by a low volume filling factor.

In an example, the heating device can comprise an arrangement of several heating elements which may be designed as current-carrying conductors and are surrounded by the reaction volume or the reaction solution and/or the sample liquid. Advantageously, this may enable the heating device to act at many different locations in the reaction volume. This may be particularly favorable in typical cases in which only a very low concentration of nucleic acid molecules to be amplified is present at the start of a PCR and the average distance of these molecules from the nearest heating element is therefore large. It can be estimated that a nucleic acid single strand with a length of 100 base pairs takes about a time $t=x^2/D_{DNA}$ to move a distance x from its starting point by diffusion (where $D_{DNA} \approx 10^{-11}$ m$^2$/S is). In an example, the spatial distance of any point in the reaction volume from the nearest heating element can be less than 3 mm (millimeters), optionally less than 2 mm, optionally less than 1 mm, optionally less than 0.75 mm, optionally less than 0.5 mm, and optionally less than 0.25 mm.

In an example, one or all of the heating elements may comprise an electrically conductive metal or metal alloy or other electrically conductive material having low electrical resistivity, for example, carbon, a semiconductor material, or a conductive plastic.

In an example, one or all of the heating elements may comprise only one wire or electrical conductor or multiple wires or electrical conductors. These may be straight, bent or wound into a coil. Multiple wires or electrical conductors may be equally or unequally spaced, crossed, or not crossed. Each wire or electrical conductor may have a round, oval, flat, or any other cross-section. A heating element may also simply be a continuous surface, for example, a flat surface vaporized with metal.

An example of the heating device is an arrangement, optionally a periodic arrangement, of conductive metallic wires. The wires may be aligned parallel to each other. The wires of the array may have a diameter between 0.5 and 100 µm (micrometers), optionally between 1 and 50 µm. The wires may be spaced between 20 and 1500 µm apart.

The wires may be made of gold and/or other metals, or they may be designed as sheathed wires in which the core is made of a less expensive and more stable material, preferably a metal. The sheathed wires may be with stainless steel, molybdenum or optionally tungsten cores with a sheath of an inert material, optionally gold; such wires can advantageously be designed very thin (and thus with high OVV) due to the high strength of the core and still allow the desired chemical properties of the preferably noble metal sheath due to the sheath material. Sheath wires with a tungsten core (tungsten advantageously has a much higher tensile strength than gold) may be preferred, optionally with a core diameter between 5 and 40 µm and a gold sheath between 0.1 and 2 µm thick.

In another example, metallic foils may be used as heating elements, which may traverse the reaction volume and which may be designed as grids, for example by punching, electroforming, laser or water jet cutting, etching techniques or other processes.

In an example, the heating element is applied to an electrically non-conductive or poorly conductive material. Optional heating elements comprise a metallic film that has been applied to a non-conductive structure by electroplating, chemical deposition, PVD, printing or other methods. For example, the non-conductive structure may be a very fine injection molded part (a preferred structure size is less than 300 µm) or by a rapid prototyping process. Fabric structures, can also be considered as heating elements or supports for heating elements; in particular, such materials with mesh sizes between 20 µm and 3 mm, especially preferably between 100 µm and 1.5 mm, can serve as heating elements or as supports for heating elements. If the mesh structures themselves are conductive, then they can advantageously serve as a heating element as a whole; if they are made of non-conductive material (for example, a plastic), they can be metallized so that the current flows only through a thin surface layer (typically<10 µm), resulting in a large surface area. In other words, the wires or fibers of the mesh or grid may have a comparatively large surface area, but only the thin, applied metallic volume is actively heated. Here, for the purposes of the disclosure, only the part through which the current essentially flows is to be regarded as the heating element; for example, if a plastic structure made of PMMA is vapor-deposited with a gold film, then only the gold film is to be regarded as the heating element.

Functionalizing the Heating Device

In an example, at least one of the heating elements of the heating device is conjugated with one or more functional nucleic acids, i.e., functional nucleic acids are linked to the heating element. All heating elements of the heating device may be conjugated with functional nucleic acids. Advantageously, this allows the functional nucleic acids to be specifically heated by the heating device without having to heat the entire reaction volume. If several heating elements are contained in a reaction volume, the heating elements can preferably be conjugated with the same or different functional nucleic acids.

According to an example, at least some of the functional nucleic acids are designed as extraction nucleic acids. This offers the advantage that the functional nucleic acids can hybridize with target nucleic acids present in the sample liquid and in this way bind the target nucleic acids to the heating element. By removing the heating element from the sample liquid, the bound target nucleic acids can then be extracted from the sample liquid.

In an example, the heating element(s) is (are) conjugated with functional nucleic acids that are designed as primers for a PCR, the primers being very preferably designed as forward and/or reverse primers of the PCR method. The functional nucleic acids can be designed both as extraction nucleic acids and as primers. Alternatively or additionally, some functional nucleic acids may be designed as extraction nucleic acids, while other functional nucleic acids are designed as primers for PCR in the reaction solution.

In an example, forward primers but not reverse primers are provided on a heating element or a portion of a heating element and/or reverse primers but not forward primers are provided on a heating element or a portion of a heating element. The molecules of the other primer in each case may be freely suspended in the reaction volume. If a separation layer is used between the heat-generating component of the heating device and the reaction volume, the functionalization must be carried out in such a way that the functional nucleic acids are accessible from the reaction solution or from the sample liquid, i.e. that they are preferably attached to the surface of the heating element.

In another example, at least one of the heating elements is conjugated with both forward and reverse primers. In an example, all of the heating elements of the heating device are conjugated with both forward and reverse primers. With this example, it can be advantageously achieved that the PCR product of a forward primer only has to travel a short distance to hybridize with the reverse primer of the same heating element, so that hybridization can take place more quickly and therefore the PCR process can be run more quickly.

In an example, a heating element is provided with a material on its surface that allows for the attachment of nucleic acids. For example, a gold-plated surface can be used to bind a primer to a heating element via one or more thiol bond(s). Also, for example, a streptavidin-biotin bond can be used to bind a primer onto the heating elements if, for example, preferably previously, one of the two partners (streptavidin or biotin) has been bound onto the heating elements and the primer is modified (at the 5' end) with the other of the two partners and subsequently bound over it to the heating element. Other modifications, such as amino or carboxy groups, can also be used to bind primers onto the heating elements, and the surface of the heating element can be modified for this purpose, for example, preferably beforehand, with epoxy. Binding may take place in such a way that the 5' end of the primer is bound to the heating elements so that the 3' end is free and can thus be elongated by the polymerase during PCR.

In an example in which both forward and reverse primers are immobilized on a heating element, the spacing between primer molecules of different types can be deliberately chosen to be on average less than 1 nm (nanometer), less than 3 nm, less than 5 nm, less than 15 nm, or less than 50 nm apart. This example advantageously exploits the fact that once a forward primer has been elongated on the surface of the heating element, this newly written nucleic acid strand hybridizes after denaturation with a corresponding adjacent reverse primer molecule on the surface or with a reverse primer molecule nearby. Since this process takes place on the surface of the heating elements, the local concentrations may be extremely high; thus, the new nucleic acid strand does not have to travel several micrometers by diffusion to find a reverse primer molecule because there are many reactants in the immediate vicinity—only a few nanometers away (the same is true in reverse with elongated reverse primer molecules that find immobilized forward primer molecules in the vicinity).

In an example, in addition to at least the functional nucleic acid(s), there are also filler oligonucleotides and/or filling molecules on the heating elements, i.e. oligonucleotides or molecules that do not actively participate in the PCR as primers and/or as extraction nucleic acid and/or fluorescent probe or target nucleic acid, but only serve for surface saturation or passivation to prevent non-specific (i.e. not by specific hybridization with primers) binding of an amplicon or a target nucleic acid to the surface of the heating element. Filling oligonucleotides preferably have a length of between 5 and 50 nucleotides, particularly preferably between 10 and 40 nucleotides, and most preferably between 20 and 30 nucleotides. In particular, they may also consist of only one type of nucleotide, for example A30 sequences with 30 adenine bases. Filling molecules can be, for example, biotin or polyethylene glycol, for example additionally provided with a functional group such as, for example, thiol, in order to immobilize the filling molecules on the heating element surface. Filling molecules can also be, for example, bovine serum albumin.

In a further example of the method, the oligonucleotides and/or functional nucleic acids on the heating elements have a spacer sequence as a partial sequence. The spacer sequence is located on the side of the respective oligonucleotide and/or functional nucleic acid facing the heating element. Thus, the spacer sequence serves as a spacer to the remaining part of the oligonucleotide. In an example, an oligonucleotide contains both a partial sequence that has the function of a primer and is referred to as a primer sequence and a partial sequence that is a spacer sequence. Advantageously, because the primer sequences are spaced further from the heating elements by the spacer sequences, the nucleic acids to be amplified and the DNA polymerases can have better access to the primer sequences.

In an example of the process according to the disclosure, one or more non-basic (abasic) modifications may be present between the spacer sequence and the primer sequence to prevent overwriting of the spacer sequence by the polymerase; the related contents of patent application DE 102013215168 A1 are incorporated by reference as part of the present disclosure. Such modifications may be, for example, 1',2'-dideoxyribose (dSpacer), triethylene glycol spacers (Spacer 9) or hexa-ethylene glycol spacers (Spacer 18), which prevent further polymerase activity in the 3' direction. This can be used to ensure that the spacer sequence does not serve as a template for the nucleic acid strand synthesized by the polymerase and that the resulting PCR product does not become unnecessarily long. An elongated PCR product that also contains the complementary sequence to the spacer sequence would have a significantly increased melting temperature with the oligonucleotides on the nanoparticles and would unnecessarily hybridize non-specifically in subsequent hybridization steps, making the entire PCR more nonspecific.

Heating Duration

The heat supply through the heating device may vary during the PCR. The heat supply through the heating device may vary during at least one run of the duplication cycle of the PCR, especially preferably during at least three, particularly preferably in at least 10, especially preferably in at least 20, of the runs of the duplication cycle of the PCR, particularly preferably periodically.

In an example, the duration of the heating by the heating device in the denaturing step (hereinafter the heating by the heating device in the denaturing step is also referred to as "heating pulse") is at least one, optionally at least three, optionally at least 10, optionally at least 20, of the runs of the amplification cycle of the PCR in the interval between 100 ns (nanoseconds) and 30 ms, optionally between 0.5 µs (microseconds) and 10 ms, optionally in the interval between 1 µs and 5 ms, optionally between 1 µs and 3 ms, optionally between 1 µs and 1 ms, optionally between 1 µs and 800 µs and optionally in the interval between 1 µs and 500 µs. It is an achievable advantage of this example that localization of the heat and thus of the resulting temperature distribution can be achieved; in other words, due to the short heating duration, little heat is transported from the heating element into the solution by heat diffusion. At the same time, it is achievable with this example that the heating duration is not too short to allow sufficient melting or unwinding of the nucleic acid double strands during the time of local heating and/or to allow the two single strands to move far enough apart by Brownian motion (and or other forces) during the time of local heating to not rehybridize with each other.

In an example, the duration of the denaturation step constitutes only a small fraction of the total duration of the PCR. Optionally, during at least one run of the amplification cycle of the PCR, optionally during at least three, optionally during at least 10, optionally during at least 20 of the runs of the amplification cycle of the PCR, the denaturation step accounts for less than 10%, optionally less than 5%, optionally less than 3%, optionally resp. less than 1%, optionally less than 0.5%, optionally less than 0.05%, and optionally less than 0.01% of the time used for the respective total run of the duplication cycle of the PCR. Advantageously, by this example, it is achievable that hybridizations can take place for virtually the entire duration of the PCR. Since the polymerase in the local PCR can operate for virtually the entire time, the process time can be reduced. It is also achievable that due to the heating only taking place locally, and moreover very briefly, the polymerase enzymes involved and also other reaction partners are spared and lose their processivity less quickly.

In an example, during at least one run of the amplification cycle of the PCR, optionally during at least three, optionally during at least 10, optionally during at least 20, of the runs of the amplification cycle of the PCR, the duration of the denaturation step is $t_{heat}$ is shorter than $t_{heat} \leq (s1 \cdot |x|)^2/D$ where s1 is a scaling factor, |x| is the critical distance, and D is the thermal diffusivity. The scaling factor s1 is preferably s1=100, optionally s1=10, optionally s1=1, optionally s1=0.1, optionally s1=0.01. The critical distance |x| is the minimum distance from a point on the heating device or the heating element to the respective nearest point on a part of the heating device that is not directly adjacent, for example to the nearest heating element of the heating device. If parallel wires are used as the heater, for example, the distance between two wires is the critical distance. If the heating element(s) are constructed of a 2D structure (such as a grid, mesh, honeycomb, etc.), the mesh size or the size of the holes/recesses is the critical size |x|; if the heater(s) is/are made of a 3D structure, the average pore size is the governing parameter |x|

In an example, the critical distance of periodically built-up heating devices can be determined by means of Fourier transformation of the spatial structure of the heating device (for example by means of numerical method based on a 3D CAD model of the heating device). For this purpose, the reciprocal of the spatial frequency may be modeled with the highest contribution in terms of magnitude, which is equal to the critical distance. (The Fourier transformation can be performed in 3D, or 1D or 2D along different spatial axes).

With this example it is achievable that the heating duration is so short that the heat diffusion distance is much smaller than the mean distance |x|, heat fields of neighboring heating elements or generally neighboring, non-adjacent parts of the heating device thus do not overlap. In particular, scaling factors greater than 1 may be advantageous for very long amplicons where it takes longer to unwind the two nucleic acid strands (the time for a nucleic acid double strand to unwind by Brownian motion increases with the fourth power of length); scaling factors less than 1 may be advantageous for the best possible heating and cooling dynamics.

Electricity Storage

A device according to an example is designed in such a way that its electrical power consumption does not exceed 50 W, optionally 20 W, optionally 10 W, optionally 3 W, optionally 2.5 W, optionally 1.5 W, optionally 0.5 W, at any time during the PCR. This restriction does not apply to possibly higher power consumptions during the switch-on process of the device, such as may be caused by inrush currents due to technical reasons. Such increased power consumptions are not considered power consumptions during PCR, and are therefore not considered here. With this example, it is advantageously achievable that the device can be operated on common portable power sources, for example on a motor vehicle battery, on the cigarette lighter of a motor vehicle or on a port of a PC, a tablet computer or a cell phone, for example on a USB or an Apple Lightning port.

The device may comprise an electricity reservoir. It is preferably set up in such a way that the electrical energy held in the electricity storage device is greater than 0.1 J/mL in relation to the capacity of the reaction vessel, optionally greater than 1 J/mL, optionally greater than 2 J/mL, optionally greater than 3 J/mL. The electricity storage device can advantageously be used to temporarily store the electricity for the varying electricity requirement of the heating device due to varying heat supply.

An apparatus comprising an electricity storage device can preferably be arranged such that the electrical energy stored in the electricity storage device is less than 100 J/mL, optionally less than 50 J/mL, optionally less than 30 J/mL, in relation to the capacity of the reaction vessel. This example can take advantage of the fact that the electricity storage device can be designed to be small because of particularly efficient heating by the heating device. As a result, the device according to the example can advantageously be designed to be particularly compact, inexpensive and portable.

The electricity storage device may comprise one or more capacitor(s), coil(s) or battery(ies) or a combination of the foregoing. In an example, the storage capacity of the energy storage device can be such that it can hold at least 20%, optionally at least 40%, optionally at least 50%, optionally at least 60%, optionally at least 80%, optionally at least 100%, optionally at least 150%, optionally at least 200%, optionally at least 300% of the electrical energy required for the denaturation step of a run of the amplification cycle of the PCR. This example can avoid the need to provide a power source capable of providing the electrical power required for the denaturation step for the entire duration of the denaturation step. Instead, advantageously, the energy storage can be charged in the time between the denaturation steps, which is usually much longer than the duration of the denaturation step. In this way, it is achievable that the device according to the example can be equipped with a weaker power source related to its electrical power, for example with a weaker power supply unit. Provided that the electricity storage device provides less than 100% of the energy required for the denaturation step of a run of the amplification cycle of the PCR, it can advantageously be kept very small, but the remaining energy must then be provided by an additional, appropriately dimensioned power source, for example a power supply unit, during the denaturation step. Values of 100% and more are advantageous, since the current source feeding the capacitor or capacitors can then be kept correspondingly small and, moreover, the voltage does not collapse due to the load of the heating; in particular, it is advantageously achievable that a current source of the device according to the example need only be dimensioned in such a way that it is capable of providing the amount of energy required for the denaturation step over the duration of a duplication cycle of the PCR, but not already during the much shorter denaturation time.

In an example, in at least one, optionally in at least three, optionally in at least 10, optionally in at least 20, of the runs of the amplification cycle of the PCR, the ratio between the electrical power consumption of the device and the capacity of the reaction vessel does not exceed 1 W/mL, optionally 0.5 W/mL, optionally 0.25 W/mL, optionally 0.1 W/mL, at any time during the PCR. This restriction does not apply to possibly higher power consumptions during the switch-on process of the device, as may be caused by technically induced inrush currents. Such increased power consumptions are not considered power consumptions during PCR, and are therefore not taken into account here.

In an example, the electricity storage device is designed to hold the energy for the denaturation steps of at least 5, optionally at least 10, optionally at least 20, optionally at least 40, optionally at least 100 runs of the amplification cycle of a PCR. Advantageously, this can provide a device, in particular a portable device, that can perform one or even more complete polymerase chain reactions independently of another power source.

Capacitors may be high-capacitance capacitors, optionally electrolytic capacitors or supercaps, optionally each with a low ESR value. Such capacitors are available on the market at low cost and are easy to size. For example, using the equation $$Q = \frac{1}{2}CU^2 \text{ resp. } C = \frac{2 \cdot Q}{U^2}$$

it can be calculated that to provide 1 J (Joule) of electrical energy (which would be sufficient for the denaturation step of a reaction volume of size 1 mL if the electrical energy is converted to heat with almost no loss according to one embodiment) at a voltage U of 30 V, a capacitor with a capacitance of 2222 µF (microfarad) would be sufficient. However, the capacitor would then be fully discharged at the end of the heating pulse, so that in practice the use of a capacitor with at least 1.5 times higher capacitance may be recommended unless the current source can supply a significant part of the current.

In an energy storage device according an example, the capacitance of the capacitor or, in the case of a plurality of capacitors, the sum of the capacitances of these plurality of capacitors may be greater than 100 µF, optionally greater than 200 µF, optionally greater than 500 µF, optionally greater than 1 mF (millifarad), optionally greater than 1.5 mF. In an energy storage device according to an example, the ratio between the capacitance of the capacitor or, in the case of a plurality of capacitors, the sum of the capacitances of these plurality of capacitors and the size of the reaction volume may be greater than 0.01 mF/mL (millifarad per milliliter), optionally greater than 0.1 mF/mL, optionally greater than 1 mF/µL, optionally greater than 5 mF/mL, optionally greater than 10 mF/mL. With this example, advantageously enough energy can be stored temporarily to achieve sufficient heating of the heating element in the denaturation step.

Batteries may be high-current batteries or accumulators, especially lithium-polymer accumulators, lithium-ion or lithium-iron phosphate accumulators. In an example, the battery or batteries are used in combination with one or more capacitors. In another example, the battery or batteries, optionally lithium iron phosphate accumulators, which are characterized by an advantageously low internal resistance, may be used without additional use of a capacitor. It may be favorable if the supply leads between the capacitor(s) and/or batteries up to the heating element are as short as possible in order to reduce interfering inductances and ohmic resistances of the supply leads.

Reaction Vessel

A device for amplifying nucleic acids may have at least one reaction vessel for holding the reaction volume or the reaction solution and/or the sample liquid. The reaction vessel of the method according to an example can be classical PCR reaction vessels such as PCR tubes or assemblies of PCR tubes (such as so-called 8-strips) or multiwell plates, but also, for example, flat plates or other shapes that can be filled. The heating device or element(s) can be added to the reaction vessels during the production process (for example, injection molding) (for example, wires that penetrate the walls of multiwell plates or PCR tubes) or added after the production process (such as wires in the form of coils that can be suspended in the individual wells of a multiwell plate).

The heating device may be placed in a sample carrier and/or sample plate that can accommodate the heating device and the reaction volume, so that the heating device is particularly accessible to target nucleic acids in the sample liquid and/or the reaction solution. In particular, the sample support and/or sample plate allows electrical contacting of the heating device and enables the sample liquid and/or reaction solution to be accommodated in a sealed and leak-proof manner. For this purpose, part of the heating device and/or the supply lines to the heating device are preferably embedded in the sample carrier or in the sample plate, e.g. by over-molding the heating device in an injection molding process or by a layer-by-layer bonded structure as described in DE 10 2016 120 124 B. In particular, the heating device according to the disclosure can optionally also be integrated into a microfluidic or macrofluidic cartridge (e.g., for on-site analysis), which enables partial or complete integration of a molecular diagnostic or DNA analytical detection process by the methods according to the disclosure, if necessary in combination with conventional methods. In an example, for example, the relative movement between reaction solution or sample liquid and heating device on a partially or fully integrated cartridge can be realized by moving the reaction solution back and forth on the cartridge (e.g., by pumping), which can be achieved, for example, by actuating a bellow and/or blister on a cartridge by an external actuator and moving the liquid in the reaction vessels/volumes in this way, while the rigid heating device preferably does not move.

Control Device

An apparatus according to an example comprises a control device which applies electric current to the heating device in order to heat the reaction volume. The control device may be designed such that in at least one, optionally in at least three, optionally in at least 10, optionally in at least 20, of the runs of the amplification cycle of the PCR, the ratio between the electrical energy used in the denaturation step for heating the reaction volume and the capacity of the reaction vessel is less than 40 J/mL (millijoules per milliliter), optionally less than 20 J/mL, optionally less than 10 J/mL, optionally less than 3 J/mL.

In a device according to an example, the control device is designed such that at least one heating element of the heating device has an extension of more than 1.5 µm in at least one direction. Each heating element of the heating device may have an extension of more than 1.5 µm in at least one, optionally in two direction(s). The extension may be, for example, a length or a diameter of an elongated heating element. An elongated heating element may have a diameter of at least 1 µm, optionally of at least 2 µm, optionally of at least 5 µm. An elongated heating element may have a length of at least 0.1 mm, optionally of at least 1 mm, optionally of at least 2 mm. In the case of a net- or honeycomb-shaped heating element, the extent may also be, for example, the thickness (meaning the extent of the webs perpendicular to the surface of the net or honeycomb) or the diameter of the webs. Some webs may have a thickness or diameter of at least 1 µm, optionally of at least 5 µm, optionally of at least 10 µm.

The control device may be configured to allow or increase a current flow through the heating device at the beginning of the denaturing step—or at the beginning of each time interval of the denaturing step, if the denaturing step consists of several time intervals separated from each other—and to stop or decrease it again after the denaturing step—or after the end of each time interval of the denaturing step—to cause a current pulse. In the heating element, the current pulse may be converted to a heating pulse. The preferred control device comprises a current source, which in turn may comprise, for example, a power supply, one or more battery/batteries or accumulators, or a fuel cell. The control device may comprise one or more capacitors. The control device may comprise a switch that can turn on and off, preferably with selectable time duration, the flow of current from the power source through the heating device. Suitable switches include MOSFETs, SSRs, very fast relays, and transistors. The control device may include one or more pulse or frequency generators, DACs, or microcontrollers for timing control.

It is understood that the above features and those to be explained below can be used not only in the combination indicated in each case, but also in other combinations or on their own, without departing from the scope of the present disclosure.

The disclosure is illustrated schematically by means of examples in the drawings and is described below with reference to the drawings.

DESCRIPTION

Figure 1A:
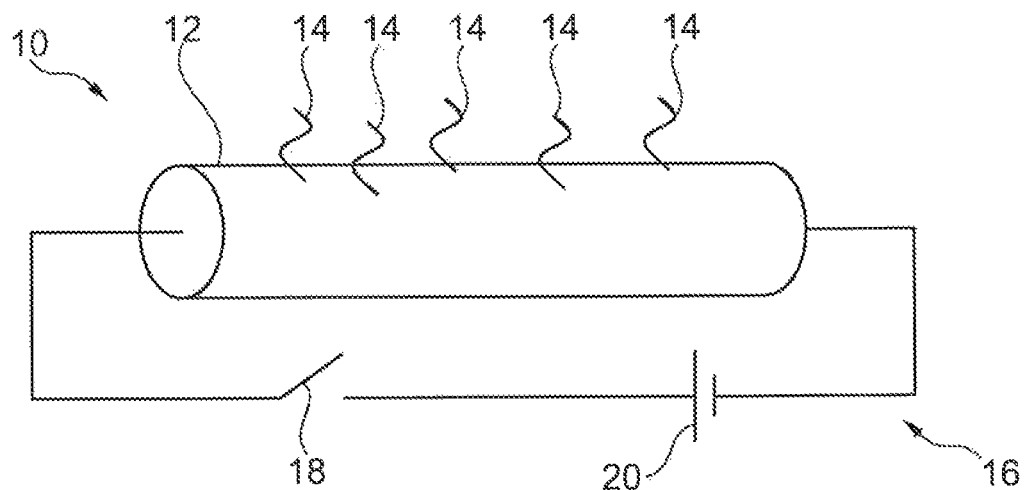
FIGS. 1A and 1B show a schematic diagram of a heating element according to an example.

FIG. 1A shows a schematic representation of a heating element 10 according to a first example. The heating element 10 is formed as a wire or heating wire 12, which is functionalized on its surface with several functional nucleic acids 14. It should be mentioned that the heating element 10 is shown only schematically and an actually used heating element 10 may have different dimensions and/or shapes and, in particular, a different ratio of length to diameter. The functional nucleic acids 14 are formed as oligonucleotides and have, at least in part, a nucleotide sequence that is at least partially complementary to the nucleotide sequence of at least part of the target nucleic acid 22 to be extracted from a sample liquid. For example, the functional nucleic acids 14 may be bound to the surface of the heating element 10 by means of a thiol and/or sulfur bond. Optionally, the heating element 10 has a surface that is conducive to binding of the extracting nucleic acids 14 to the heating element 10 and/or wire 12. For example, the heating element 10 and/or the wire 12 may be made of a noble metal, such as gold, and/or may be at least partially coated with gold on the surface to promote reliable binding of the extraction nucleic acids 14 to the heating element 10.

The heating element 10 comprises a voltage supply 16 by means of which the heating element 10 can be supplied with electrical voltage and/or electrical current in order to heat the heating element 10 and to locally heat the immediate surroundings of the heating element 10, i.e. the heated wire 12. Further, if required, the heating element 10 may optionally be used to heat globally, i.e., completely, the entire reaction solution surrounding the heating element 10. For example, by closing the switch 18, an electrical voltage provided by the voltage source 20 can be applied to the heating element 10 such that an electrical current flows through and resistively heats the heating element 10 in a controllable manner. For example, the current may be provided in pulsed form to achieve as sharp a temperature gradient in time and/or space as possible in a reaction solution in the immediate vicinity of the heating element.

Figure 1B:
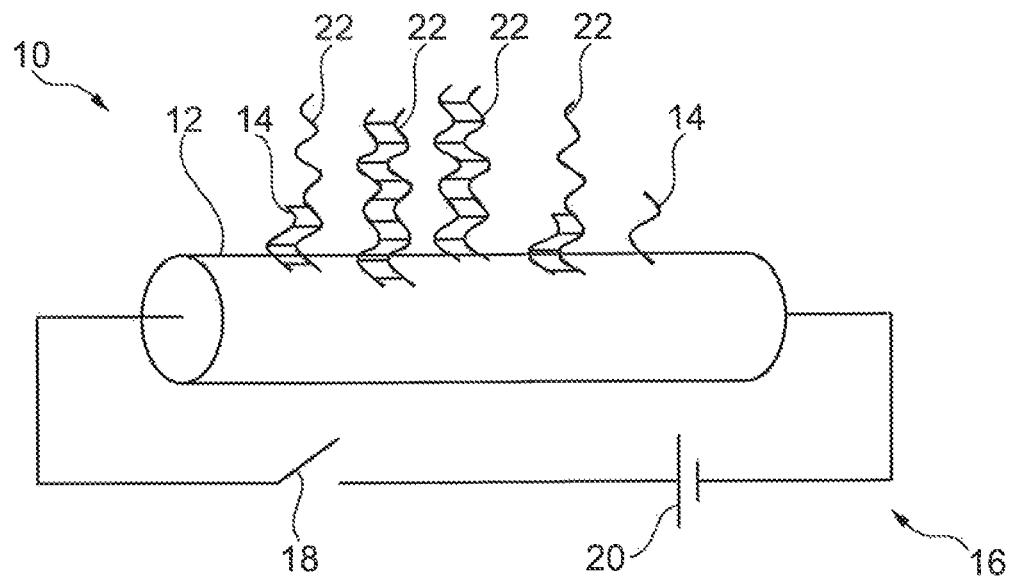

For extraction of the target nucleic acid 22 from a sample liquid, the heating element 10 may be at least partially covered with the sample liquid. For amplification of the target nucleic acid 22 in a reaction solution, the heating element 10 may be contacted with the reaction solution as described in DE 10 2016 120 124 A1. For example, the heating element 10 can be at least partially immersed in the sample liquid or reaction solution and/or doused with the sample liquid or reaction solution. Provided that the nucleic acid 22 to be extracted is present in the sample liquid or reaction solution and is preferably free, i.e. unbound, a single strand of the nucleic acid 22 can attach to a functional nucleic acid 14 and hybridize with it, provided that this is not already occupied by another nucleic acid. FIG. 1B shows the heating element of FIG. 1A with nucleic acids 22 bound to it, which have been extracted from a sample liquid. The nucleic acids 22 form at least partially double strands with the extraction nucleic acids 14. According to an example, the heating element 10 may be used to provide a temperature suitable for hybridization of the nucleic acid 22 with the extraction nucleic acid 14 in the immediate vicinity of the heating element 10, for example to enhance and/or accelerate hybridization.

Once the target nucleic acids 22 have bound or hybridized to the heating element 10 via the functional nucleic acids 14, the heating element 10 along with the nucleic acids 22 may be separated from the sample liquid again, leaving the nucleic acids 22 attached to the heating element 10. For example, the heating element 10 may be removed from the sample liquid once the heating element 10 has been immersed therein, and/or the sample liquid may be poured off and/or aspirated. Also, one or more wash cycles may be performed to remove as completely as possible any residue from the sample liquid that may have settled on the heating element 10. However, the washing cycles should be selected with respect to the washing reagents or washing solutions and/or with respect to the execution in such a way that the nucleic acids 22 are still at least partially bound to the heating element 10 with the functional nucleic acids 14 even after the washing cycles.

Figure 2A:
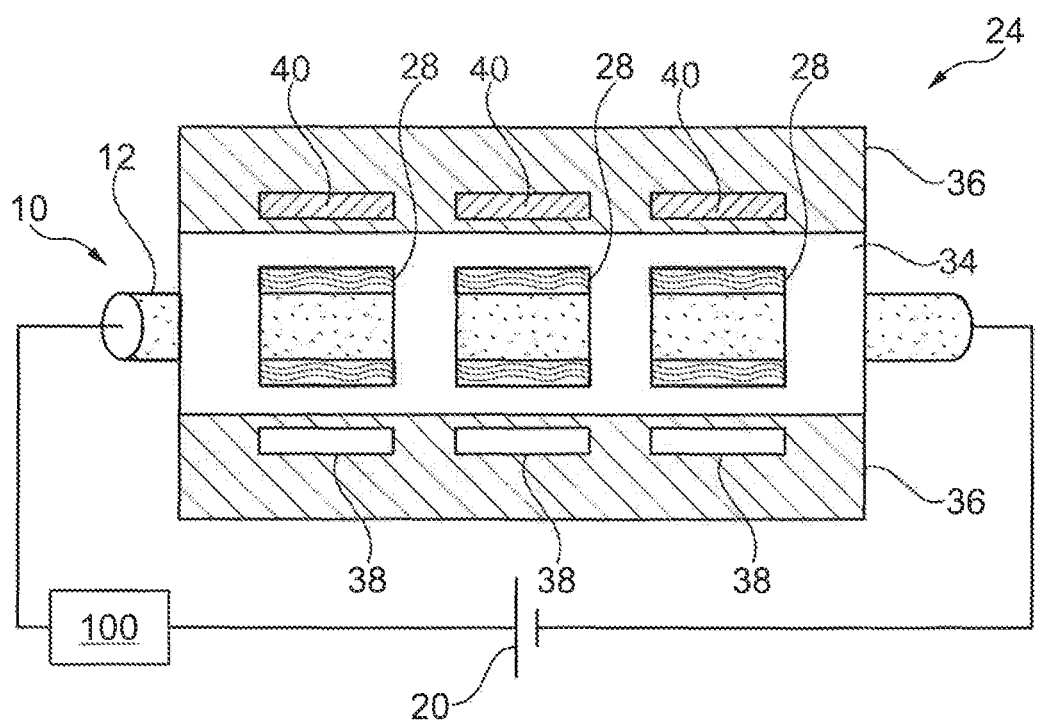
FIGS. 2A and 2B show schematic and simplified cross-sections of examples of a device for extracting a nucleic acid.

FIG. 2A shows a schematic and simplified cross-section of an example of a device 24 for extracting and/or amplifying a nucleic acid 22, which has a plurality of reaction vessels 28 and in which the heating elements 10 are formed by sections of a wire 12 which passes through the plurality of reaction vessels 28 and is connected to a voltage source 20. The wire is thereby functionalized with functional nucleic acids 14, each of which serves both as an extraction nucleic acid and as a primer for an amplification reaction. The wire 12 passes through several separate reaction vessels 28 in the form of sample liquid chambers (also referred to as "wells") in a sample plate 34 located between a two-part temperature control block 36 that serves as an external heating device. The wire 12 thus forms a separate heating device or one or more separate heating elements in each of the reaction vessels 28. The temperature control block 36 functions to bring and maintain the reaction volumes in the reaction vessels 28 to hybridization/elongation temperature. For example, the temperature control block 36 may be configured as a heating block and/or a cooling block. For bringing the heating elements 10 into contact and/or separating them from the sample liquid and/or from the reaction solution, the sample liquid and/or the reaction solution can be filled into or aspirated from the reaction vessels 28.

In the example shown here, an excitation light source (in this case in the form of a light-emitting diode 38 with a low-pass optical filter) for exciting a dye in the respective reaction volume is located in the lower part of the temperature control block 36 below each reaction vessel 28, and a photodiode 40 is located in the upper part of the temperature control block 36 above each sample liquid chamber as a light sensor for detecting the fluorescence of the excited dye in the respective reaction volume (with a high-pass optical filter that transmits the fluorescent light). These can be used, for example, to detect the amplified nucleic acid 22 using appropriate dyes, such as intercalating dyes and/or TaqMan probes. The signals from the light sensors can be read out, for example, using an analog-to-digital converter, and thus the time course of the fluorescence signal can be observed. In particular, the fluorescence light can preferably be recorded in real time during the performance of the PCR as a function of the PCR cycles, thus enabling real-time PCR ("Real-Time PCR").

Further, the apparatus 24 comprises a moving device 100 adapted to move the heating element relative to the sample liquid or relative to the reaction solution. This is accomplished by the heating element 10 preferably in conjunction with an optional external magnetic field (not shown) and/or with the magnetic field generated by other energized heating elements. Due to the suitable energization, the current flow through the heating element generates a magnetic field which interacts with the external magnetic field and leads to a movement of the heating element relative to the sample liquid or relative to the reaction solution.

Figure 2B:
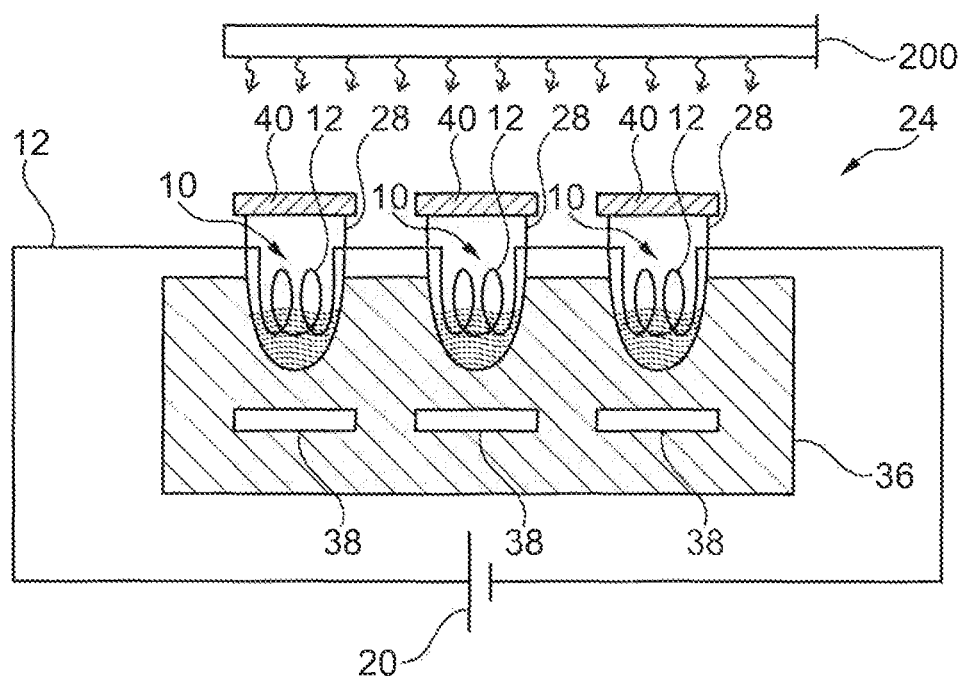

FIG. 2B shows schematically and simplified a cross-section of a device 24 for extracting a nucleic acid 22 according to a further example, which differs from the example of FIG. 2A in that the heating elements 10 are designed as coils of sections of a wire 12 connected to a voltage source 20. The heating elements 10 in the form of wire 12 wound into coils are in contact with the reaction volume in the respective reaction vessel 28. Other than shown in the figure, they are preferably completely surrounded by the reaction solution or the sample liquid. In this example, the reaction vessels 28 are formed as a plurality of separate sample liquid chambers in the form of reaction tubes located in a temperature control block 36 to bring and maintain the reaction volumes at hybridization/elongation temperature. In the example shown here, a light emitting diode 38 as an excitation light source for exciting a dye in the reaction volume is located in the lower part of the temperature control block 36 below each sample liquid chamber, and a photodiode 40 as a light sensor for detecting the fluorescence of the excited dye in the reaction volume is located above each sample liquid chamber.

Furthermore, the apparatus 24 has a moving device 200. The moving device 200 is set up to apply sound waves and/or ultrasonic waves to the sample liquid or reaction solution located in the reaction vessels 28 and to move it in this way relative to the heating elements 10.

Figure 2C:
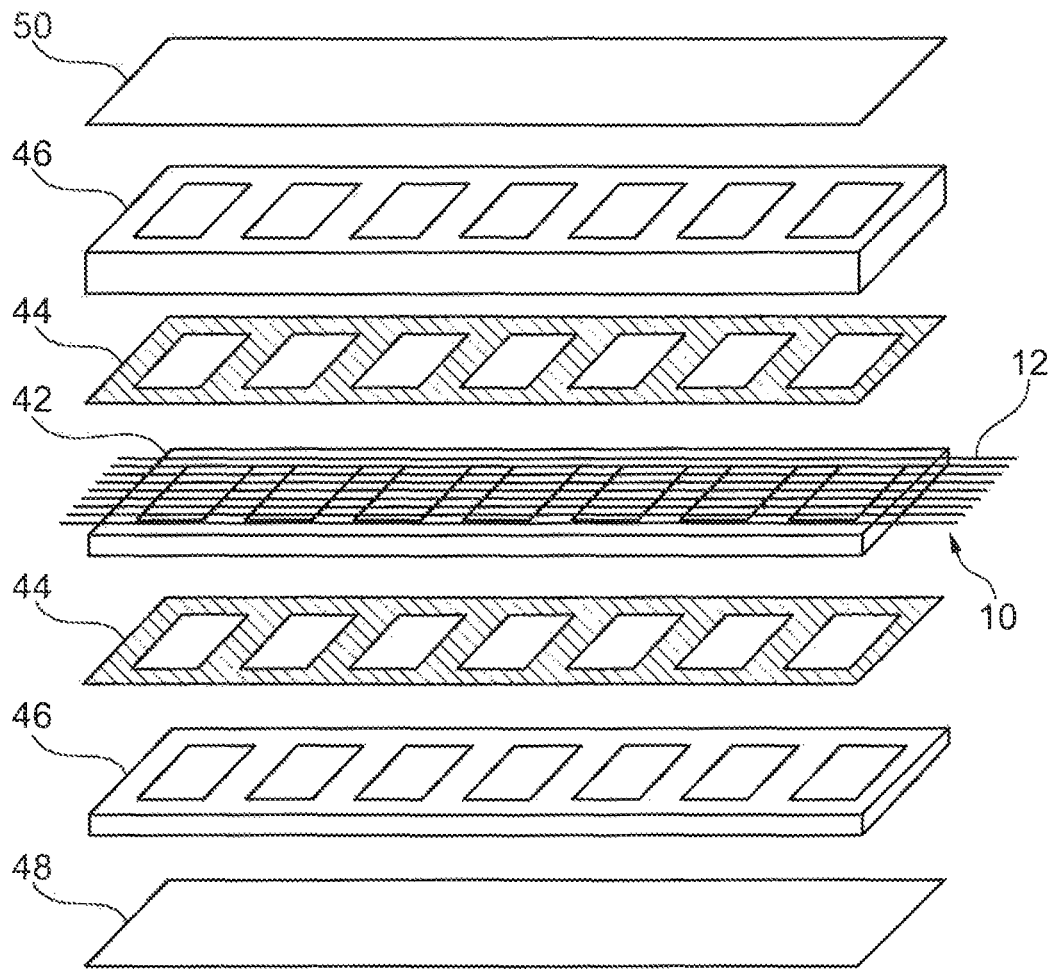
FIG. 2C shows a specimen plate according to an example.

FIG. 2C schematically shows components from which a sample plate of a device 24 for extracting and/or amplifying a nucleic acid 22 according to an example with wire heating elements 10 can be created. Sections of a gold-plated sheathed wire 12 of 25 μm diameter (24.8 μm tungsten core with approximately 100 nm gold sheath, LUMA-METALL AB, Kalmar, Sweden) serve here as heating elements 10. This is wound around an acrylic glass plate 42 with a thickness of 0.5 mm (middle plate shown in light). There are seven openings (6 mm×6 mm) in the acrylic plate 42 through which the reaction vessels 28 or sample liquid chambers (wells) are formed. By winding the wire 12, two parallel layers of 25 parallel heating elements 10 each are formed in each reaction vessel 28 (these are only visible when the device is assembled) (a different number of heating elements between typically 10 and 75 heating elements per layer may also be advantageous). The two layers of heating elements 10 have a distance of 0.7 mm from each other through the plate, and the heating elements 10 within one layer have a distance of about 0.24 mm from each other. From both sides, for example, with the help of double-sided adhesive films 44 (shown in dark, 100-250 μm thick VHB adhesive tape from 3M) with corresponding recesses for the sample liquid chambers, another acrylic glass plate 46 (thickness of the lower plate 0.5 mm and thickness of the upper plate 3 mm) with the same openings is glued onto each of the wrapped plates 42 and pressed according to the manufacturer's instructions for the adhesive tape 44. From below, the wells or reaction tubes are sealed, for example, with a thin film 48 (shown in light, Adhesive PCR Foil Seal, 4titute), which is glued to the lower acrylic glass plate 46. In this way, a sample plate with seven wells is formed, through which parallel wires 12 are passed as heating elements 10. The wires 12 are connected together at the two outer ends of the sample plate (that is, all wires/heating element are connected in parallel) and electrically contacted. This allows current pulses to be sent serially through the heating elements of all wells or reaction vessels 28. The sample plate openings (shown here at the top) can then be sealed with a thin film 50 (shown in light). According to this example, the sample plates have a width of 20 mm and a length of 90 mm (so that the voltage of the heating pulses drops substantially over a length of about 96 mm, taking into account the 3 mm projection of the wires 12 at the ends of the sample plate required for contacting). Typically, this results in a total electrical resistance of approximately 250 milliohms over the length of the sample plate (with 50 wires connected in parallel).

Figure 2D:
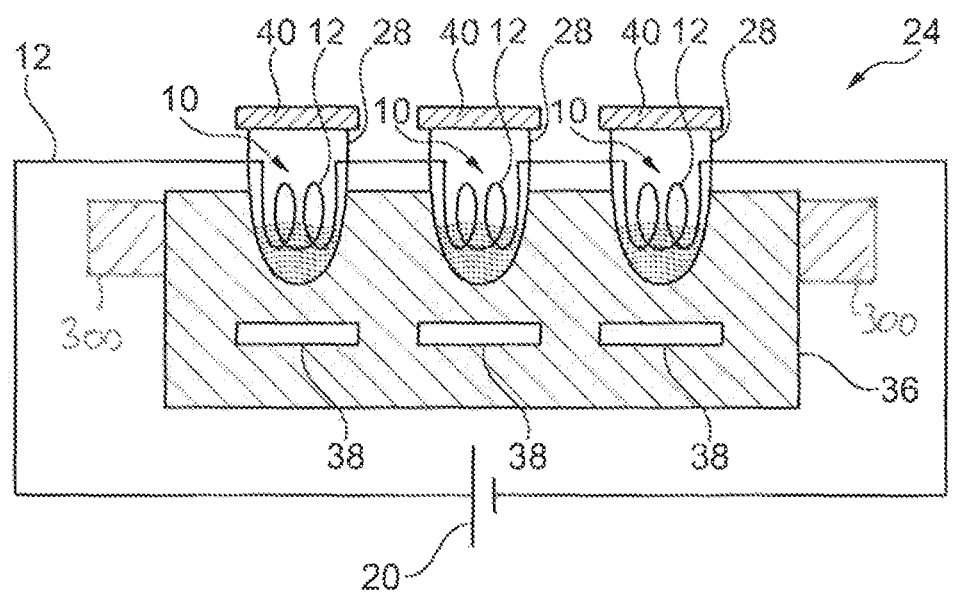
FIG. 2D schematically shows a device for extracting a nucleic acid according to a further example.

FIG. 2D schematically shows a device 24 for extracting a nucleic acid according to a further example, which corresponds in many aspects to the device 24 of FIG. 2B. However, one difference is that the device 24 according to FIG. 2D has a moving device 300, which is designed as a vibration device. The moving device 300 is formed laterally on the temperature control block 36 and, according to the example shown, comprises two vibration elements, such as piezo actuators, which are arranged in direct mechanical contact with the temperature control block 36. The moving device 300 is arranged to excite the temperature control block 36 and, via the latter, the reaction vessels 28 to oscillate and/or vibrate in such a way that the sample liquid 500 or reaction solution 400 arranged in the reaction vessels 28 and/or the heating elements 10 arranged in the reaction vessels 28 are excited to oscillate and/or vibrate. The motion device 300 may preferably comprise further elements, which may serve, for example, to supply the vibration elements with energy and/or to control and/or regulate them.

According to other examples, the moving device and/or the vibration device and/or the vibration elements may be formed, for example, below the temperature control block 36 and/or on top of the temperature control block 36 and/or on the reaction vessels 28. According to other examples, the motion device 300 may have only one vibrating element or may have a separate vibrating element for each reaction vessel 28.

Figure 3A:
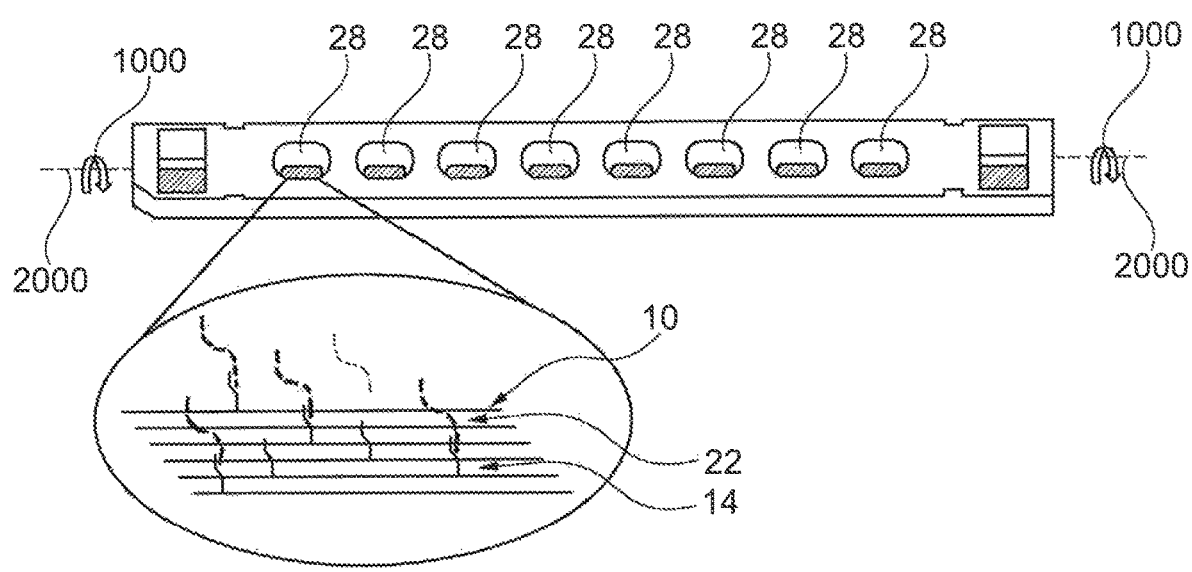
FIGS. 3A and 3B schematically show an example of a sample plate when used for extraction and/or amplification of a target nucleic acid.

FIG. 3A shows a schematic representation of an example. According to this example, a sample plate as shown in FIG. 2C, which comprises several reaction vessels 28, is used.

The sample plate may be designed as shown and explained in FIG. 2C, for example. According to this example, the sample plate can be pivoted by means of a moving device (not shown), in particular during the incubation time (together with the heating block), through an angle 1000 which is optionally +/−10°, optionally +/−20°, optionally +/−30°, optionally +/−40°, optionally +/−50°, optionally +/−60°, optionally +/−70° optionally +/−80°, optionally +/−90°, and optionally more than +/−90° with a frequency of preferably 1 time per minute, optionally 3 times per minute, optionally 10 times per minute, optionally 20 times per minute, optionally 30 times per minute, optionally 60 times per minute, is tilted back and forth about preferably one axis of symmetry of the sample plate, optionally two axes of symmetry of the sample plate, and optionally three axes of symmetry of the sample plate, so that the reaction solution sloshes back and forth in the reaction chambers and in this way a relative movement is caused between heating elements (preferably wires) and the reaction solution/sample liquid. It may be achieved hereby that at low concentrations (e.g. less than optionally 1000 or optionally 100 or optionally 10 copies or optionally 5 copies) of the nucleic acid to be amplified, at a higher percentage positive real-time PCR curves are achieved in the subsequent amplification reaction according to DE 10 2016 120 124.3. According to the disclosure, this is attributed to the fact that more binding/capture/hybridization events of nucleic acids to the functionalized heating elements are caused by the externally induced relative movement between heating elements and reaction or sample liquid.

In the lower portion of FIG. 3A is an enlarged schematic representation of the heating elements 10 that traverse the reaction vessels 28 and are connected to functional nucleic acids 14 and target nucleic acids 22.

Figure 3B:
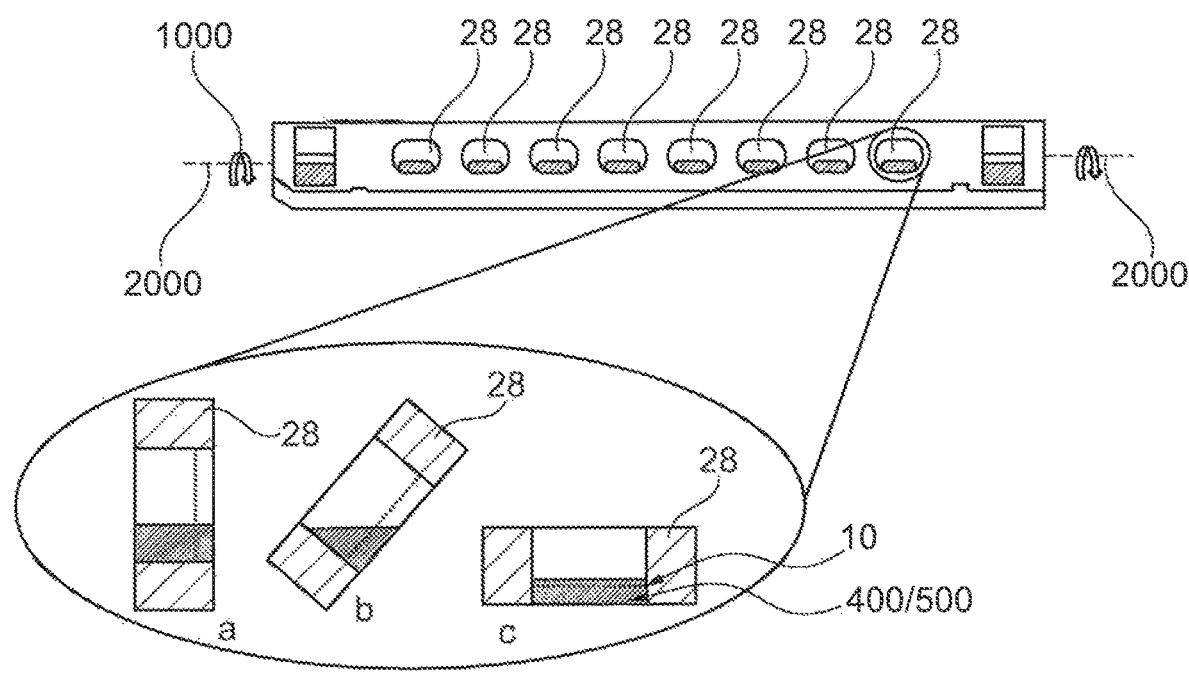

In FIG. 3B, the tilting movement caused by the moving device according to the example shown in FIG. 3A is explained in more detail during hybridization according to an example, but without being limited to it. The sample plate, the reaction chambers 28 of which are filled with the reaction solution 400 or with the sample liquid 500, is placed in the device 24 and heated by a heating block at 56° C. from below and at 63° C. from above. The entire fixture containing the sample plate is now moved for five minutes as follows: at a frequency of 20 times per minute, the entire fixture is tilted through an angle 1000 of +90° along the longitudinal axis 2000 of the sample plate and returned to the starting position. From the initial position, the fixture is now tilted through an angle 1000 of −90° along the longitudinal axis 2000 of the sample plate and then the fixture with the sample plate is returned to the initial position. After the entire fixture has been moved in this manner for five minutes, the sample plate is removed from fixture 24 and the sample plate is moved at room temperature for an additional two minutes at a frequency of 20 times per minute as described above.

The lower sketch shows the movement of the reaction solution during a +90° tilting movement (without return to the initial position).

The lower portion of FIG. 3B further shows a reaction vessel or chamber 28 including the heating elements 10 and the reaction solution in three different tilt positions a, b and c. The tilting motion of the sample plate causes the reaction solution 400 or sample liquid 500 to slosh back and forth in the reaction chamber 28, causing relative movement between the heating elements 10 and the reaction solution 400 or sample liquid 500.

Experiments performed with example embodiments are explained below by way of example, but without limiting the disclosure to these examples.

In particular, the experiments below show that relative movement of the liquid, i.e., the sample liquid or reaction solution, and the heating elements causes an increase in the binding efficiency of the target nucleic acid to the functional nucleic acids on the heating elements.

Experiment 1—Relative Movement by Means of Ultrasound

In this experiment, to generate the relative movement between the liquid, i.e. the sample liquid and/or the reaction solution, and the heating elements, ultrasound is applied to the liquid and the target nucleic acids bound to the functional nucleic acids are determined. This is then compared with a comparative measurement in which no ultrasound was applied but an otherwise identical measurement was performed.

The reaction vessels are provided as reaction plates with several reaction chambers and are equipped with wires as local heating elements, as described in patent application DE 10 2016 120 124 A1. In the present experiment, there are 20 gold-coated wires with a length of 6 mm per reaction chamber or reaction vessel. The heating elements used here are in the form of wires, have a core diameter of 14.6 μm made of tungsten and are coated with 200 nm gold (LUMA METALL, Sweden) and are spaced 0.076 mm apart. The heating elements run approximately 0.7 mm above the bottom of the reaction vessel, which has a footprint of 6 mm×6 mm, so when filled with 600 of sample liquid, it is filled to a height of approximately 1.7 mm (above the bottom). The heating elements run continuously through several adjacent sample chambers or reaction vessels and have a total length of 10 cm in the entire sample carrier (but only 6 mm per sample chamber or reaction vessel).

Functionalization of the functional nucleic acids onto the gold-coated wires (heating elements) was performed as described in DE 10 2016 120 124 A1. Briefly mentioned here, a functionalization solution contains 100 nM functional nucleic acid and 100 mM MgCl2 in phosphate buffer. 50 μl of this was used per reaction tube and incubated overnight at 4° C. This functionalization solution would be removed from the reaction tubes the following day and then the reaction tubes were washed three times with sufficient water. Then, the free surface of the heating elements was saturated with 3% plasma solution for 10 min at room temperature to avoid nonspecific binding of the target nucleic acid onto the gold surface of the heating elements. The excess plasma solution was washed out three times with sufficient water.

For hybridization of the target nucleic acid to the functional nucleic acid, the target nucleic acid (extracted genomic DNA from MRSA (methicillin-resistant Staphylococcus aureus) was mixed with hybridization buffer (commercially available AL buffer from QUIAGEN, final concentration 25%). In each case 600 of the hybridization buffer with the target nucleic acid was pipetted into the reaction vessels and tightly sealed with a pressure sensitive foil (5000 copies of genomic DNA per reaction vessel) so that all heating elements within the reaction vessels are (completely) in contact with the solution.

The reaction vessels were then sunk to the bottom in an ultrasonic bath (type UMD030, manufacturer EUMAX, 260 W total power) and sonicated in contact with the bottom of the ultrasonic bath for 10 min at 25° C., causing relative movement between the liquid in the reaction vessels and the heating elements. The reaction vessels were then removed from the ultrasonic bath and briskly pipetted or removed the solution of hybridization buffer and unbound target after removing the foil. The reaction tubes were then washed three times with wash buffer (based on 9 mM MgCl2 and 10 mM Tris pH: 8) at room temperature.

All heating elements were then cut out of the reaction tubes and transferred to a PCR tube using tweezers. These heating elements were then covered with sufficient PCR master mix. The PCR master mix contained specific primers and probes for the target nucleic acid, a DNA polymerase, dNTPs, and the usual components of a classic real-time PCR mix. Subsequent qPCR was performed in a LightCylcer instrument (ROCHE) to determine the amount of target nucleic acid that had previously bound to the functional nucleic acid and the heating elements.

As a reference or comparative measurement, a further reaction plate or further reaction vessels were used, which were otherwise treated in the same way as in the previous measurement, but instead of 10 minutes in the ultrasonic bath, they were incubated for only 10 minutes without agitation and thus without induced relative movement between the liquid and the heating elements at room temperature. In these reaction vessels, it was found that only about 2% of the offered 5000 copies of genomic DNA per reaction vessel (target nucleic acid) have bound to the functional nucleic acids on the heating elements, whereas in the reaction vessels treated in the ultrasonic bath to induce relative motion, about 19% of the offered 5000 copies of genomic DNA per reaction vessel (target nucleic acid) have bound to the functional nucleic acid on the heating elements.

Figure 4:
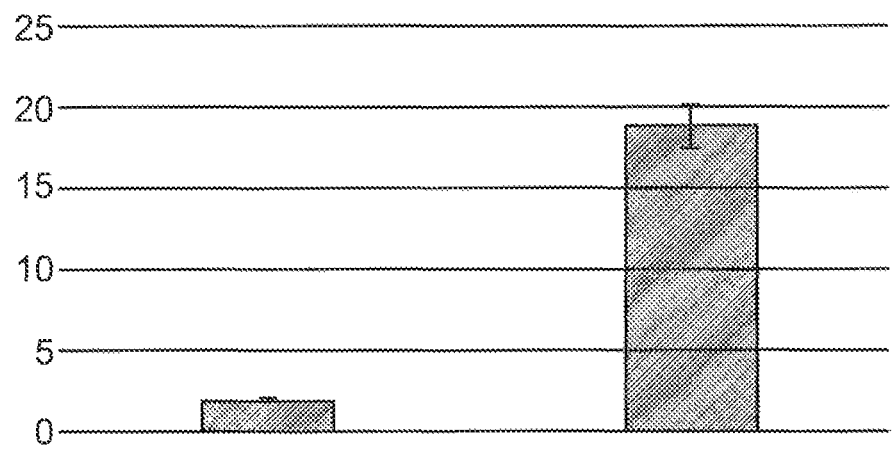
FIG. 4 shows the results of experiment 1 in a bar graph.

The results are shown graphically in the bar chart FIG. 4. The y-axis shows the percentage of the target nucleic acid used that bound to the functional nucleic acids. The left bar shows the results of the comparative measurement without ultrasound impact and indicates a proportion of approximately 2% of bound target nucleic acids. The right bar shows the result of the measurement in which relative movement was induced by ultrasound. Here, the proportion of approx. 19% is significantly higher than in the comparison measurement.

Accordingly, it could be shown that the extraction efficiency could be increased by a factor of about 10. Accordingly, it is expected that the sensitivity of such a device and/or method for extraction and/or amplification and/or detection of a target nucleic acid can also be improved by at least a factor of 10 compared to conventional embodiments without relative motion.

Experiment 2—Relative Movement by Means of Oscillating Heating Elements

In this experiment, similar preparations were made as already explained above with reference to experiment 1. However, in contrast to Experiment 1, the number of heating elements (wires) per reaction chamber was increased from 20 to 75, but the spacing was unchanged from Experiment 1. The functionalization solution here contains 500 nM functional nucleic acid and 500 mM MgCl2 in phosphate buffer. 500 of this was used per reaction vessel and incubated for only 10 minutes at room temperature. In addition, only 500 copies of genomic DNA were used per reaction tube instead of 5000 copies.

An AC voltage was applied for three minutes to the ends of the wires or heating elements passing through the sample support and thus through the reaction vessels (square waveform, 2 V peak-to-peak, offset 1V, DutyCylce 50% frequency 4.5 kHz, with the voltage applied over the entire 10 cm length of the heating elements or wires). The reaction plate or the reaction vessels themselves were kept at room temperature. Neodymium-iron-boron (NdFeB, N42) permenent magnets (diameter, about 5 mm; height, about 8 mm) were located above and below the respective reaction vessels. The distance between the magnet above the reaction chamber and the corresponding magnet below was about 5 mm. While the pulsating DC voltage was applied, an acoustic buzzing was audible, which is considered to be an indication of oscillation of the wires or the heating elements in the reaction vessels and thus of the movement of the heating elements. The buzzing was particularly amplified by the external permanent magnets, as it became quieter when the magnets were removed for testing. As the current flows through the heating elements, magnetic fields are created around the heating elements or wires, resulting in repulsion of the heating elements or wires from each other (especially for the wires that are at the edge, and therefore have no or a smaller number of adjacent wires), as well as interaction with the external magnetic field according to the Lorentz force that acts on current-carrying conductors in a magnetic field. Different orientations of the magnetic field may produce movements of the current-carrying wires along different directions. Subsequently, after removing the foil, the solution of hybridization buffer and unbound target nucleic acid was pipetted from the reaction chambers. The reaction chambers were then washed three times with wash buffer (based on 9 mM MgCl2 and 10 mM Tris pH: 8) at room temperature.

All heating elements were then cut out of each reaction tube and transferred with forceps to a PCR tube for quantification of DNA on the heating elements using a conventional qPCR thermal cycler (Roche Lightcycler). These heating elements were then covered with sufficient PCR master mix in the PCR tubes. The PCR master mix contained the target-specific primers and sample nucleic acids, a DNA polymerase, dNTPs, and the usual components of a classic real-time PCR mix. Subsequent qPCR was performed in a LightCylcer instrument (ROCHE) to determine the amount of target nucleic acid that had previously bound to the functional nucleic acid.

As a reference or comparative measurement, another reaction plate or reaction vessels were used, which were treated in the same way as in the previous measurement, but instead of applying voltage for three minutes to excite oscillation, they were incubated for only three minutes without movement or oscillation at room temperature. This reaction plate shows that only about 3% of the 500 copies of genomic DNA offered per reaction chamber (target nucleic acid) have bound to the functional nucleic acid on the wires, while on the reaction plate with the reaction vessels whose heating elements were subjected to pulsating DC voltage for vibration excitation, about 25% of the 500 copies of genomic DNA offered (target nucleic acid) per reaction vessel have bound to the functional nucleic acid on the heating elements.

Figure 5:
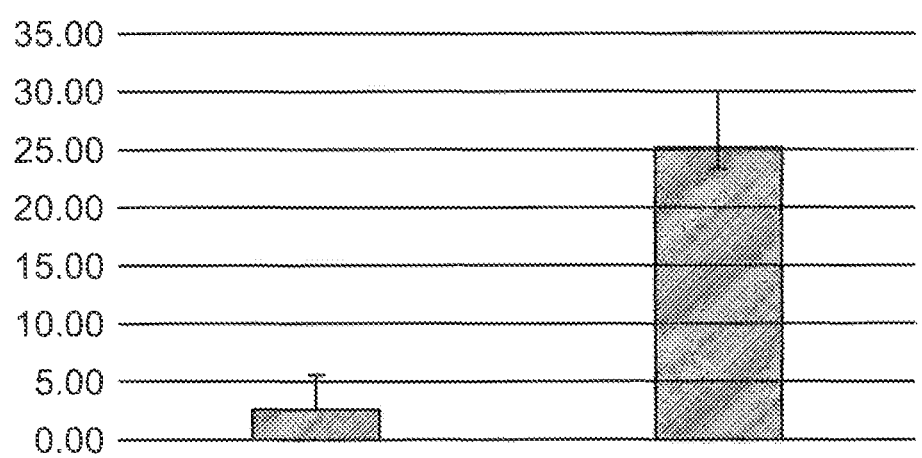
FIG. 5 shows the results of experiment 2 in a bar graph.

The results are shown graphically in the bar chart FIG. 5. The y-axis shows the proportion of the target nucleic acid used that is bound to the functional nucleic acids is shown in %. The left bar shows the results of the comparative measurement without oscillation excitation of the heating elements by means of electrical voltage and indicates a proportion of approx. 3% of bound target nucleic acids. The right bar shows the result of the measurement in which the heating elements were excited to oscillate by means of the pulsating DC voltage, thus causing a relative movement between the heating elements and the liquid. Here, the proportion of approx. 25% is significantly higher than in the comparison measurement.

Accordingly, it could be shown that the extraction efficiency could be increased by more than a factor of 8. Accordingly, it is expected that the sensitivity of such a device and/or method for extraction and/or amplification and/or detection of a target nucleic acid can also be improved by at least a factor of 8 compared to conventional embodiments without relative motion.

In both experiments, a functional nucleic acid with a sequence specific for MRSA at the 3' end was used (for the functions of the other elements, please refer to DE 10 2016 120 124 A1:

```
                                                [Seq. ID 1]
    5'Thiol - AAAAAAAAAAAAAAAAAAAAAAA/iSp9/

[Seq. ID 2]
    AAATGATTATGGCTCAGGTACTGC
```

The primer used for qPCR in LightCycler was a primer/sample set that is also specific for MRSA:

```
    Forward primer:
                                                [Seq. ID 3]
    AAATGATTATGGCTCAGGTACTGC Reverse primer:
                                                [Seq. ID 4]
    TGAAGATGTGCTTACAAGTGCTA.
```

Taqman sample:
```
                                                [Seq. ID 5]
    5'FAM-TCCACCCTCAAACAGGTGAATTAT-3'BHQ1
``` iSp9 corresponds to the abasic modification Spacer9.
5'FAM corresponds to fluorescein amidites.
3'BHQ1 corresponds to the Black Hole Quencher-1

LIST OF REFERENCE SYMBOLS

10 Heating element
12 Heating wire
14 Functional nucleic acid
16 Voltage supply
18 Switch
20 Voltage source
22 Target nucleic acid
24 Device for extracting/amplifying a nucleic acid
28 Reaction vessel
34 Sample plate
36 Tempering block
38 Light diode
40 Photodiode
42 Acrylic sheet
44 Adhesive tape
46 Acrylic sheet
48 thin foil
50 thin foil
100 Moving device
200 Moving device
300 Moving device
400 Reaction solution
500 Sample liquid
1000 (Pivot) Angle
2000 Longitudinal axis of the specimen plate

The invention claimed is:

1. A method for extracting a target nucleic acid from a sample liquid comprising:
providing a heating device having a heating element in contact with the sample liquid, wherein the heating element is conjugated with at least one functional nucleic acid, and wherein the at least one functional nucleic acid is adapted to hybridize with the target nucleic acid and bind the target nucleic acid to the heating element;
generating relative movement between the heating element and the sample liquid,
wherein the relative movement between the heating element and the sample liquid is generated at least in part by moving the heating element; and
extracting the target nucleic acid from the sample liquid by separating the heating element from the sample liquid.

2. A method for amplifying a target nucleic acid in a reaction solution, comprising:
providing a heating device having a heating element in contact with the reaction solution, wherein the heating element is conjugated with at least one functional nucleic acid, and wherein the at least one functional nucleic acid is adapted to hybridize with the target nucleic acid;
generating relative movement between the heating element and the reaction solution,
wherein the relative movement between the heating element and the reaction solution is generated at least in part by moving the heating element; and
amplifying the target nucleic acid by a polymerase chain reaction in the reaction solution using the heating device.

3. A method for amplifying a target nucleic acid comprising:
extracting the target nucleic acid from a sample liquid by providing a heating device having a heating element in contact with the sample liquid, wherein the heating element is conjugated to at least one functional nucleic acid, and wherein the at least one functional nucleic acid is adapted to hybridize to the target nucleic acid and bind the target nucleic acid to the heating element; and
amplifying the target nucleic acid extracted from the sample liquid by a polymerase chain reaction in a reaction solution using the heating device;
wherein extracting the target nucleic acid further comprises generating relative movement between the heating element and the sample liquid and/or amplifying the target nucleic acid further comprises generating relative movement between the heating element and the reaction solution, and
wherein the relative movement between the heating element and the sample liquid and/or the reaction solution is generated at least in part by moving the heating element.

4. The method claim 3, wherein the generation of the relative movement between the heating element and the sample liquid occurs when the heating element is in contact with the sample liquid and/or wherein the generation of the relative movement between the heating element and the reaction solution occurs at least partially during a denaturation step of the polymerase chain reaction.

5. The method according to claim 3, wherein at least during the generation of the relative movement between the heating element and the sample liquid and/or during the generation of the relative movement between the heating element and the reaction solution, a temperature suitable for the hybridization of the target nucleic acid with the functional nucleic acid is provided at least temporarily at the site of the functional nucleic acid.

6. The method according to claim 5, wherein the temperature is at least 20° C., and the temperature is not more than 90° C.

7. The method according to claim 5, wherein providing heat for providing the temperature is at least partly performed by means of the heating element.

8. The method according to claim 3, wherein the functional nucleic acid is formed as and/or comprises an oligonucleotide.

9. The method according to claim 3, wherein the functional nucleic acid is formed as an extraction nucleic acid configured to extract the target nucleic acid and/or comprises a capture nucleotide sequence which is at least partially complementary to the nucleotide sequence of the target nucleic acid and is suitable for binding to the target nucleic acid.

10. The method according to claim 3, wherein the functional nucleic acid comprises a nucleotide sequence usable as a primer sequence for the amplification of the target nucleic acid.

11. The method according to claim 3, wherein the sample liquid and/or the reaction solution comprises one or more reagents that promote hybridization of the target nucleic acid with the functional nucleic acid.

12. The method according to claim 3, wherein moving the heating element comprises oscillating and/or vibrating the heating element.

13. The method according to claim 12, wherein the oscillating and/or vibrating of the heating element is caused by means of a magnetic field, wherein the magnetic field is generated by an electric current flow in the heating element and/or by an external magnetic field.

14. The method according to claim 12, wherein the oscillation and/or vibration of the heating element is at least partly caused by a force action by a mechanical actuator and/or by sound waves and/or ultrasonic waves.

15. The method according to claim 12, wherein the relative movement between the heating element and the sample liquid and/or the reaction solution is affected at least in part by moving the sample liquid and/or the reaction solution.

16. The method according to claim 15, wherein the moving of the sample liquid and/or of the reaction solution is performed at least partly by pumping the sample liquid and/or the reaction solution in a reaction vessel.

17. The method according to claim 15, wherein the moving of the sample liquid and/or the reaction solution is performed at least partly by applying sound waves and/or ultrasonic waves to the sample liquid and/or the reaction solution.

18. The method according to any one of claim 15, wherein the moving of the sample liquid and/or the reaction solution is performed at least in part by at least one mechanical actuator.

19. The method according to any one of claim 15, wherein the moving of the sample liquid and/or the reaction solution is caused at least in part by convection.

20. The method according to claim 3, wherein the relative movement between the heating element and the sample liquid and/or the reaction solution is at least partly caused by moving a reaction vessel in which the sample liquid and/or the reaction solution is arranged.

21. The method according to claim 3, wherein the heating device comprises a plurality of heating elements.

22. The method according to claim 3 comprising one or more heating elements, wherein the one or more heating elements are designed as one or more of the following elements: electrical heating elements, resistive heating elements, and one or more heating wires.

23. The method according to claim 3, wherein the heating element is conjugated with a plurality of the functional nucleic acids, wherein the functional nucleic acids of the heating element are of identical or at least partially different design.

24. The method according to claim 22, wherein each of the heating elements is respectively conjugated with a plurality of functional nucleic acids of a same type, and each of the different heating elements are respectively conjugated with functional nucleic acids which are at least partially different from the respective functional nucleic acids of the other heating elements.

* * * * *